United States Patent
Hayashi

(10) Patent No.: US 7,352,735 B1
(45) Date of Patent: Apr. 1, 2008

(54) COMMUNICATION METHOD, COMMUNICATION SYSTEM, AND COMMUNICATION TERMINAL

(75) Inventor: Morihiko Hayashi, Kanagawa (JP)

(73) Assignee: Sony Corporation (JP)

( * ) Notice: Subject to any disclaimer, the term of this patent is extended or adjusted under 35 U.S.C. 154(b) by 1132 days.

(21) Appl. No.: 09/762,424

(22) PCT Filed: Jun. 8, 2000

(86) PCT No.: PCT/JP00/03734

§ 371 (c)(1),
(2), (4) Date: Aug. 22, 2001

(87) PCT Pub. No.: WO00/76133

PCT Pub. Date: Dec. 14, 2000

(51) Int. Cl.
*H04B 7/212* (2006.01)

(52) U.S. Cl. .................... 370/348; 370/322; 370/437

(58) Field of Classification Search ............... 370/431, 370/320, 321, 322, 341, 346, 347, 348, 437, 370/442, 443, 447, 458, 461, 462, 444, 459
See application file for complete search history.

(56) References Cited

U.S. PATENT DOCUMENTS

| | | | | |
|---|---|---|---|---|
| 5,065,398 | A * | 11/1991 | Takashima | 370/230 |
| 5,303,234 | A * | 4/1994 | Kou | 370/442 |
| 5,640,395 | A * | 6/1997 | Hamalainen et al. | 370/322 |
| 5,659,881 | A * | 8/1997 | Kent | 455/520 |
| 5,729,542 | A * | 3/1998 | Dupont | 370/346 |
| 5,822,311 | A * | 10/1998 | Hassan et al. | 370/322 |
| 6,005,852 | A * | 12/1999 | Kokko et al. | 370/329 |
| 6,172,971 | B1 * | 1/2001 | Kim | 370/348 |
| 6,545,995 | B1 * | 4/2003 | Kinnunen et al. | 370/341 |
| 6,618,363 | B1 * | 9/2003 | Bahl | 370/329 |
| 7,203,204 | B2 * | 4/2007 | Carneal et al. | 370/431 |

FOREIGN PATENT DOCUMENTS

WO    WO 97/39556    10/1997

OTHER PUBLICATIONS

Wei-Hong Chen et al. "CSMA/CD/TDMA: A Dynamic Combination For Voice and Data Integration"; Multiple Facets of Integration; San Francisco, Jun. 3-7, 1990, Proceedings of the Annual Joint Conference of the Computer and Communications Societies; (INFOCOM), Washington, IEEE Comp. Soc. Press, US, vol. 3, conf. 9, Jun. 3, 1990, pp. 842-849, XP000164303 ISBN: 0-8186-2049-8.

Sharrock S. M. et al. "A CSMA/CD-Based, Integrated Voice/Data Protocol With Dynamic Channel Allocation"; Computer Networks and ISDN Systems, North Holland Publishing; Amsterdam, NL. vol. 18, No. 1, Nov. 24, 1989, pp.1-18, XP000070488; ISSN: 0169-7552.

* cited by examiner

*Primary Examiner*—Chi Pham
*Assistant Examiner*—Kevin Mew
(74) *Attorney, Agent, or Firm*—Lerner, David, Littenberg, Krumholz & Mentlik, LLP

(57) ABSTRACT

In order to enable use of both real time access and random access and to achieve improvement of throughput of a communication device and a communication network, a LAN terminal device (1), acting as a control station, allocates communication timing corresponding to a communication timing allocation request from a first LAN unit (2) and a second LAN unit (5) intending to transmit real time data and notifies each LAN terminal device connected to the same network of information indicating this allocated communication timing. A communication terminal of the requester transmits data through a real time region based on communication timing allocated thereto and random data is transmitted through a random access region.

84 Claims, 14 Drawing Sheets

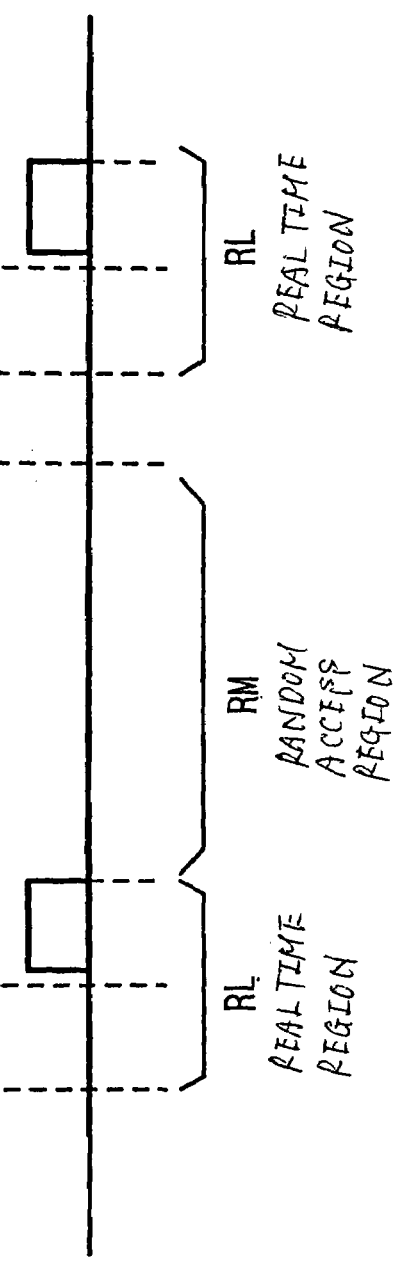
FIG. 4A HEAD TIMING SIGNAL
FIG. 4B TRANSMISSION PACKET FROM LAN UNIT 22
FIG. 4C TRANSMISSION PACKET FROM LAN UNIT 52
RL REAL TIME REGION
RM RANDOM ACCESS REGION
RL REAL TIME REGION

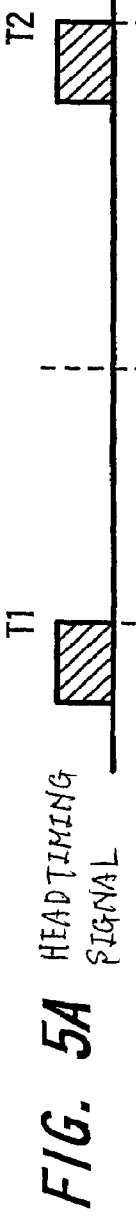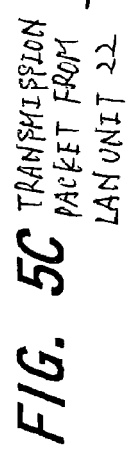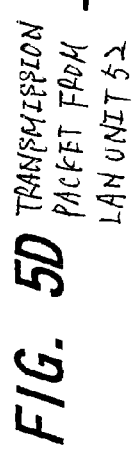
FIG. 5A HEADTIMING SIGNAL
FIG. 5B DISTURBING SIGNAL
FIG. 5C TRANSMISSION PACKET FROM LAN UNIT 22
FIG. 5D TRANSMISSION PACKET FROM LAN UNIT 52

FIG. 9A
HEAD TIMING SIGNAL
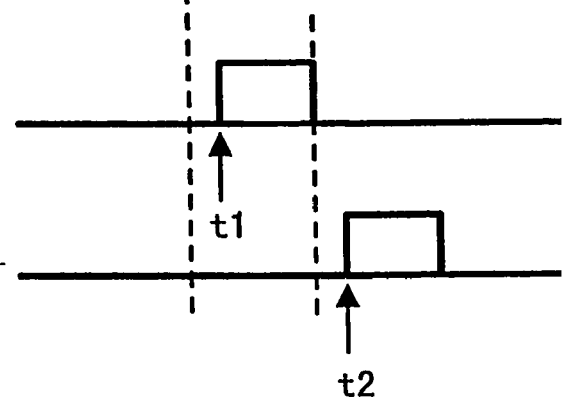
FIG. 9B
TRANSMISSION PACKET FROM LAN UNIT 22
FIG. 9C
TRANSMISSION PACKET FROM LAN UNIT 52
FIG. 10A
HEAD TIMING SIGNAL
FIG. 10B
DISTURBING SIGNAL SUCH AS EXTERNAL NOISE
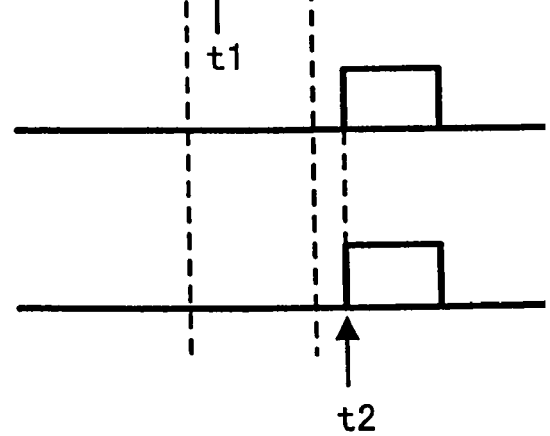
FIG. 10C
TRANSMISSION PACKET FROM LAN UNIT 22
FIG. 10D
TRANSMISSION PACKET FROM LAN UNIT 52

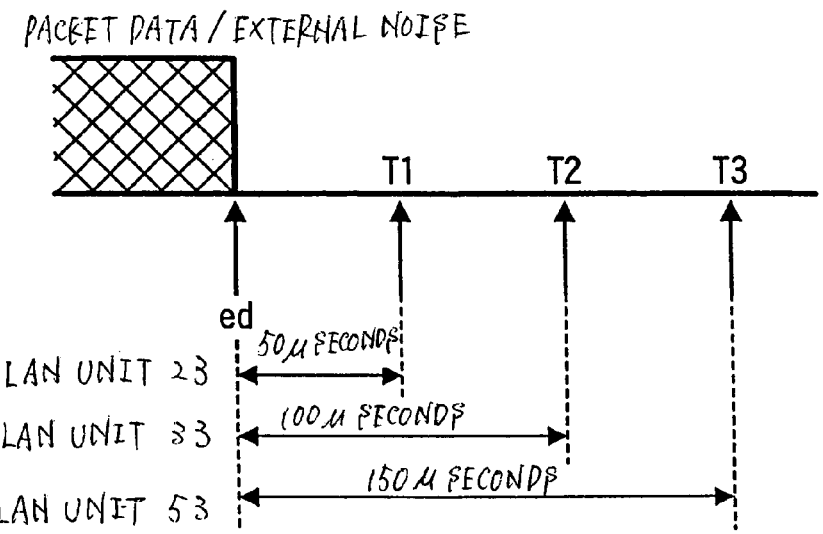
FIG. 13
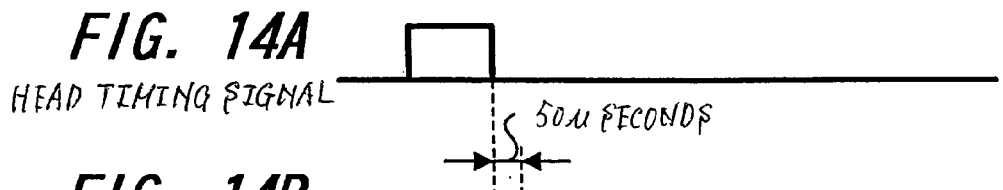
FIG. 14A
HEAD TIMING SIGNAL
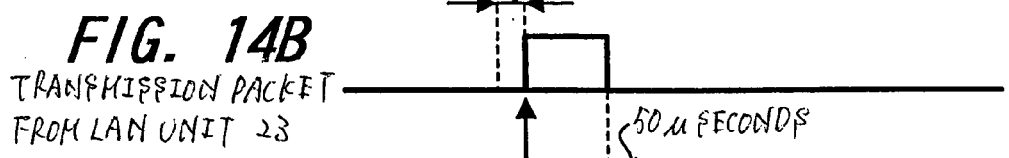
FIG. 14B
TRANSMISSION PACKET FROM LAN UNIT 23
FIG. 14C
TRANSMISSION PACKET FROM LAN UNIT 33
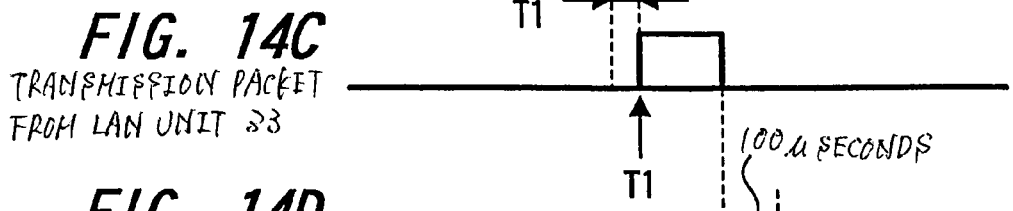
FIG. 14D
PACKET TRANSMISSION TIMING t3 FROM LAN UNIT 53
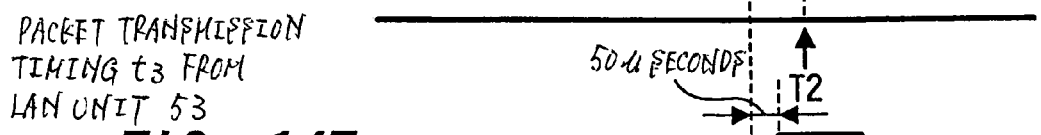
FIG. 14E
TRANSMISSION PACKET FROM LAN UNIT 53
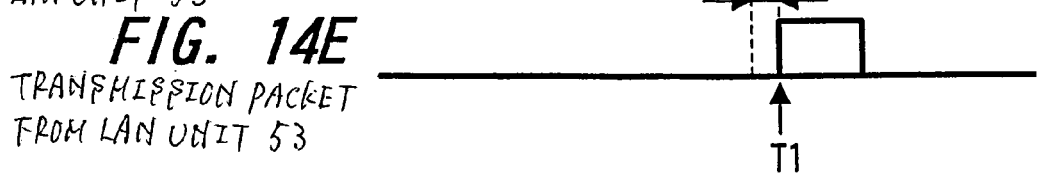

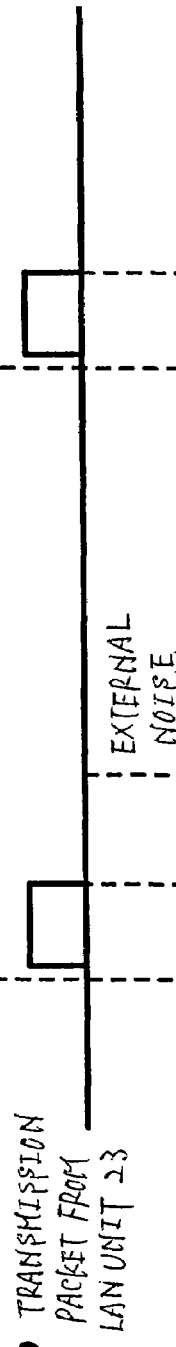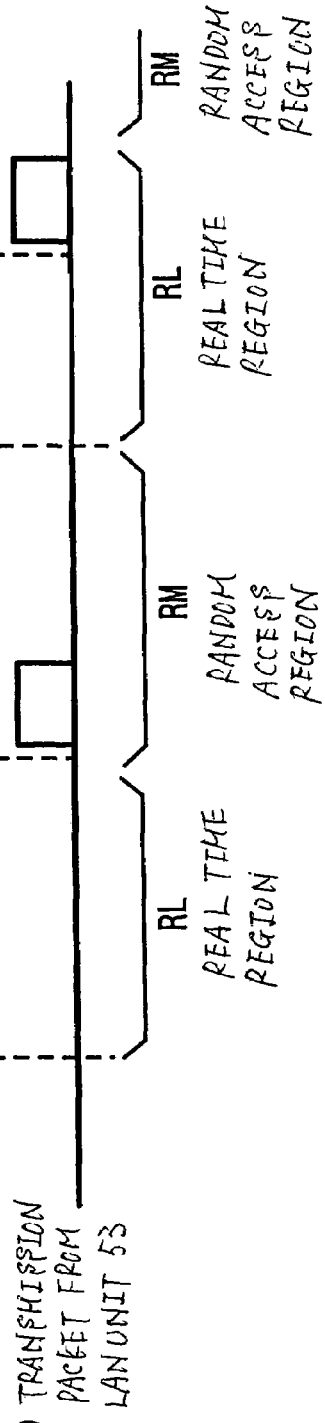
FIG. 17A HEAD TIMING SIGNAL
FIG. 17B TRANSMISSION PACKET FROM LAN UNIT 23
FIG. 17C TRANSMISSION PACKET FROM LAN UNIT 33
FIG. 17D TRANSMISSION PACKET FROM LAN UNIT 53

COMMUNICATION METHOD, COMMUNICATION SYSTEM, AND COMMUNICATION TERMINAL

TECHNICAL FIELD

The present invention relates to a communication method in which various devices such as computer terminals and peripheral devices are connected through network so as to achieve communication between the devices connected through this network, a communication system and a communication terminal.

BACKGROUND ART

Various communication methods which allow communication to be carried out without link-block of transmissions in the same channel are employed in a network in which the same channel is shared by plural communication terminals. For example, CSMA (Carrier Sense Multiple Access) method, TDMA (Time Division Multiple Access) method, polling method and the like are employed.

In the CSMA method, transmission data is put into a packet of a predetermined size and transmitted. A communication terminal using this method transmits the packet using a carrier having a predetermined frequency. Upon transmission of the packet, the carrier is detected (the term carrier detection is used in this specification) in order to investigate whether or not there is other packet in a channel (transmission path) for use in the transmission.

When a channel for use is found to be empty as a result of detection for the carrier, the packet transmission is carried out. This CSMA method is suitable for LAN (Local Area Network) in which transmission speed is about 1 Mbit/second-10 Mbit/second.

According to the TDMA method, a plurality of so-called time slots are formed by dividing transmission time in terms of time, so that the time slots for transmitting the packet are set up fixedly for each communication terminal at the time of communication start-up. Then, because each communication terminal transmits the packet within a time slot allocated to itself, apparently it looks as if plural communication terminals use the same channel (a single high-speed communication line) at the same time.

According to the polling method, a communication control unit inquires each of plural communication terminals using the same channel of whether or not it makes a communication request. Based on this request, the communication control unit determines a sequence of communication to a communication terminal which makes a communication request and then carries out communication.

By using these communication methods, the same channel (transmission paths) can be used by plural communication terminals without generating any collision of transmission.

DISCLOSURE OF THE INVENTION

When a communication system such as LAN is built up, throughput in communication terminal or network is demanded to be improved. Further, so-called real time data such as voice data and image data is demanded to be transmitted and received securely at real time, and data generated at random such as computer data is also demanded to be transmitted and received at random timing. However, the above-mentioned transmission methods are incapable of satisfying all these demands.

That is, the above-described CSMA method is capable of carrying out random access, in which data is transmitted and received at random, by avoiding a collision of transmissions (link-block in transmission path). However, if it is found that other communication terminal is transmitting data as a result of the aforementioned carrier detection to avoid the collision, that communication terminal cannot transmit data. Thus, random waiting time may be sometimes needed upon transmission of data, and therefore it is difficult to always maintain the throughput in a good condition. Because the CSMA method does not ensure the communication sequence unlike the TDMA method, transmission of real time data such as voice data and image data cannot be ensured.

The TDMA method can transmit real time data securely because each communication terminal transmits data according to a transmission order allocated to itself. However, because many time slots for non-use are generated in transmitting data generated at random such as computer data, this method is not effective. Therefore, the TDMA method is not suitable for random access.

Because the TDMA method does not carry out the carrier detection, if a communication terminal not obeying the TDMA method is connected to the same channel, a collision of transmission may not be avoided. That is, this method cannot coexist with a communication terminal employing other communication method than the TDMA method.

Because in case of the polling method, an overhead such as preamble, which may cause deterioration of the throughput at the communication terminal, is attached to transmitted or received data, it is difficult for this method to improve the throughput.

As described above, according to the conventional communication methods, it is difficult to satisfy all demands for using the real time access of transmitting and receiving real time data at real time and the random access of transmitting and receiving data generated at random at random timing and improving the throughput.

In views of the above described problems, an object of the present invention is to provide a communication method, a communication system and a communication terminal capable of using both real time communication (real time access) with real time data at real time and random timing communication (random access) at the same time and improving throughput in a communication terminal and a communication network.

To achieve the above object, according to claim 1 of the present invention, there is provided a communication method for plural communication terminals sharing a single channel to communicate at a predetermined communication cycle while avoiding a collision of use of the channel with other communication terminals, comprising:

a communication timing registering step for upon start-up of communication, allocating a communication timing of a communication terminal intending to start the communication within the communication cycle; and a notifying step for notifying other communication terminals sharing the channel of the allocated communication timing.

According to the communication method described in claim 1, communication timing allocated by the communication timing registering step is notified to each of the communication terminals sharing a single channel through the notifying step.

Consequently, each of the communication terminals communicates at communication timing allocated to itself so as to prevent a collision of communication with other communication terminals, thereby achieving secure communication. Further, because each of the plural communication terminals sharing a single channel knows communication timing of other communication terminals so that it can transmit or receive data at random through a region other than the region for transmitting data based on the communication timing.

According to claim 2 of the present invention, there is provided a communication method according to claim 1 characterized in that at least one communication control unit for controlling the communication cycle is provided in a network comprised of the plural connected communication terminals sharing the channel, the communication control unit, when the communication terminal intending to start communication transmits an allocation request for the communication timing to the communication control unit, executing the communication timing registering step and executing the notifying step.

According to the communication method described in claim 2, the communication timing is allocated by at least a communication control unit provided in the network and notified to each of the plural communication terminals sharing the channel.

Consequently, each of the communication terminals sharing the channel can communicate at timing corresponding to communication timing allocated to itself at each communication cycle. Further, it can know a region for other communication terminal to transmit data based on communication timing allocated to the other communication terminals and carry out random access in the other regions. Control of the communication cycle and setting of communication timing to plural communication terminals can be carried out in a unified way by the communication control unit.

According to a claim 3 of the present invention, there is provided a communication method according to claim 1 characterized in that the communication terminal intending to start communication allocates its own communication timing itself to execute the communication timing registering step and execute the notifying step.

According to the communication method described in claim 3, the communication timing is set up by a communication terminal itself which intends to transmit data for communication. At the same time, the communication timing is notified by the communication terminal itself intending to communicate to plural communication terminals sharing the channel.

Consequently, each of the communication terminals sharing the channel can communicate at timing corresponding to communication timing allocated to itself at each communication cycle. Further, it can know a region for other communication terminals to transmit data based on communication timing allocated to the other communication terminals and carry out random access in the other regions. Further, any communication control unit does not have to be provided for control of the communication cycle and setting of the communication timing.

According to claim 4 of the present invention, there is provided a communication method according to claim 1 characterized in that real time region for transmitting real time data such as voice data and image data based on the allocated communication timing and random access region for transmitting data at random timing are provided by dividing the communication cycle into two sections.

According to the communication method described in claim 4, the real time region and random region are set up in the communication cycle. The real time data such as voice data and image data is transmitted based on the communication timing through the real time region of each communication cycle. For example, data generated at random such as computer data is transmitted by random access through the random access region.

Consequently, both the real time data and random data such as computer data can be transmitted at every communication cycle. The real time data can be transmitted securely through the real time region at every communication cycle and the random data can be transmitted by random access through the random access region.

According to claim 5 of the present invention, there is provided a communication method according to claim 4 characterized in that the real time region is set up successively in the communication cycle corresponding to the communication timing allocated while a remaining region of the communication cycle is used as the random access region.

According to the communication method described in claim 5, the real time region is set up successively in a communication cycle based on the data transmission timing. Then, a region other than the real time region set up successively in each communication cycle is used as the random access region.

Consequently, the real time region and random access region are set up in each communication cycle, so that not only the real time data but also random can be transmitted at every communication cycle.

According to claim 6 of the present invention, there is provided a communication method according to claim 4 characterized in that if the real time data not transmitted through the real time region is not received properly, the real time data not received properly is re-transmitted through the random access region.

According to the communication method described in claim 6, for example, the real time data, which cannot be received properly by a mating terminal because it is not transmitted to the mating terminal properly, is re-transmitted through the random access region. As a result, even if the real time data, which should be received properly through the real time region, is not received based on the communication timing, by re-transmitting it through the random access region, the real time data can be transmitted securely to an object destination.

According to claim 7 of the present invention, there is provided a communication method according to claim 1 characterized in that the channel uses a carrier of a same predetermined frequency and avoiding of a collision of use of the channel is carried out by detecting presence or absence of the carrier.

According to the communication method described in claim 7, each of the communication terminals sharing the channel detects whether or not a carrier of a predetermined frequency exists on the shared channel so as to confirm whether or not that channel is empty. When the channel is empty, data transmission is carried out.

Consequently, if data cannot be transmitted securely to a destination because a disturbing wave is generated upon transmitting data, data is transmitted after transmission thereof is enabled by eliminating the disturbing wave. As a result, data can be transmitted securely to an object destination thereby intensifying reliability.

According to claim 8 of the present invention, there is provided a communication method for plural communication terminals sharing a single channel to communicate bi-directionally between a call terminal which is the communication terminal for calling and a mating terminal which is the communication terminal called by the call terminal at a predetermined communication cycle while avoiding a collision of use of the channel with other communication terminals, comprising:

a calling step for the call terminal to call the mating terminal of an object by random access;

a responding step for the mating terminal to respond to the call terminal when accepting a call from the call terminal; a communication timing allocation step for, if the response arise corresponding to the call, allocating communication timings for the call terminal and the mating terminal in the communication cycle; and a notifying step for notifying each of the allocated communication timing to other communication terminals sharing the channel, the call terminal and the mating terminal executing bi-directional communication by executing transmission based on the corresponding communication timings at every the communication cycle.

According to the communication method described in claim 8, when the call terminal receives a response to a call from the mating terminal, communication timings are allocated to both the call terminal and the mating terminal, so that the allocated communication timing is notified to each communication terminal. The call terminal and the mating terminal communicate based on the communication timing allocated to each thereof.

Consequently, bi-directional real time communication between the call terminal and the mating terminal can be carried out securely. Therefore, for example, bi-directional communication such as telephone and TV telephone can be carried out securely.

According to claim 15 of the present invention, there is provided a communication method for plural communication terminals sharing a single channel to communicate at a predetermined communication cycle while avoiding a collision of use of the channel with other communication terminals, comprising:

a communication order allocating step for upon start-up of communication, allocating communication order to a communication terminal intending to start communication;

a notifying step for notifying the allocated communication order to other communication terminal sharing the channel;

an empty time setting step for setting the length of empty time in the channel capable of starting transmission of data corresponding to the allocated communication order in each of the communication terminal to which the communication order is allocated; and a data transmitting step for if an emptiness of the same length as the empty time set up in the empty time setting step is detected on the channel in the communication terminal to which the communication order is allocated, transmitting data.

According to the communication method described in claim 15, a communication order allocated in the communication order allocation step is notified to each of the communication terminals sharing a channel through the notifying step. Then, in each communication terminal to which the communication order is allocated, empty time on the channel to be shared is set up in order to enable start of data transmission corresponding to communication order allocated to itself through the empty time setting step.

The empty time on the same shared channel, at least necessary just before transmitting data, is set to be 50 μseconds, 100 μseconds and 150 μseconds for a communication terminal having the first communication order, a communication terminal having the second communication order and a communication terminal having the third communication order respectively. If emptiness of 50 μseconds is detected on the same shared channel, data transmission can be started from the communication terminal having the first communication order.

Even if the communication terminal having the first communication order does not transmit data although emptiness of 50 μseconds exists on the same channel, if further emptiness of 50 μseconds continues after the emptiness of 50 μseconds is detected so that emptiness of 100 μseconds continuous on the shared channel is detected, the communication terminal having the second communication order can transmit data.

Conversely if, for example, the communication terminal having the second communication order cannot transmit data because a disturbing wave exists on the shared channel, after the disturbing wave disappears, the communication terminal having the second communication order and the communication terminal having the third communication order can transmit data successively without any collision.

Consequently, a transmission procedure possessed by a communication system can be used effectively and each of the communication terminals can share the same channel without colliding of communication with other communication terminals. Even if data transmission is disabled because a disturbing signal such as an external noise exists, after the disturbing signal disappears, each communication terminal can transmit data without disturbing the communication order. Therefore, the real time data can be transmitted securely.

According to claim 16 of the present invention, there is provided a communication method according to claim 15 further comprising:

a data transmission detecting step for detecting whether or not a communication terminal having a higher communication order than itself transmits data in each of the communication terminals to which the communication order is allocated; and an empty time reduction step for reducing the empty time set in the empty time setting step corresponding to the allocated communication order when it is detected that a communication terminal having a higher communication order than itself transmits data in the data transmission detecting step.

According to the communication method described in claim 16, if it is detected that data is transmitted from a communication terminal having a higher communication order than itself in each communication terminal through the data transmission detecting step, the empty time set in itself is reduced in the empty time reduction step.

For example, if as described above, the empty time is set up for each communication terminal such that it is 50 μseconds for a communication terminal having the first communication order, 110 μseconds for a communication terminal having the second communication order and 150 μseconds for a communication terminal having the third communication order, while data transmission of the communication terminal having the first communication order is terminated, the empty time is reduced as follows. That is, the empty time of the communication terminal having the second communication order is reduced from 100 μseconds to 50 μseconds. The empty time of the communication terminal having the third communication order is reduced from 150 μseconds to 100 μseconds.

Consequently, just after occupation of the shared channel is released after data transmission from a communication terminal having a higher communication order is terminated or the disturbing signal disappears, the empty time can be always the shortest, so that transmission of data from each communication terminal is enabled. Further, a preliminarily allocated transmission order is maintained, so that appropriate data transmission can be carried out securely.

According to claim 17 of the present invention, there is provided a communication method according to claim 15 characterized in that at least one communication control unit for controlling the communication order is provided in a network comprised of plural connected communication terminals sharing the channel, the communication control unit, when the communication terminal intending to start communication transmits an allocation request for the communication timing to the communication control unit, executing the communication order allocation step and executing the notifying step.

According to the communication method described in claim 17, the communication order is allocated by at least one communication control unit provided in the network and notified to each of the plural communication terminals sharing the same channel.

Consequently, each of the communication terminals sharing the channel can set up necessary channel empty time just before transmitting data corresponding to a communication order allocated to itself at each communication cycle. Further, based on communication order allocated to the other communication terminals, the other communication terminals can know a region for transmitting data and carry out random access through the other regions. Further, control of communication cycle and allocation of communication order to plural communication terminals can be carried out by the communication control unit in a unified way.

According to claim 18 of the present invention, there is provided a communication method according to claim 15 characterized in that the communication terminal intending to start communication allocates its own communication order by itself to execute the communication order allocating step and execute the notifying step.

According to the communication method described in claim 18, the communication order is allocated by a communication terminal itself which intends to transmit data for communication and notified to plural communication terminals sharing the channel by the communication terminal intending to communicate.

Consequently, each of the communication terminal sharing the channel can communicate corresponding to a communication order allocated to itself in each communication cycle. Further, the other communication terminals can know a region for transmitting data based on a communication order allocated to the other communication terminals and carry out random access in the other regions. Any communication control unit does not have to be provided for control of the communication cycle and setting of the communication timing.

According to claim 19 of the present invention, there is provided a communication method according to claim 15 characterized in that real time region for transmitting real time data such as voice data and image data based on the allocated communication order and random access region for transmitting data at random timing are provided by dividing the communication cycle to two sections.

According to the communication method described in claim 19, the real time region and random region are set up in the communication cycle. The real time data such as voice data and image data is transmitted based on the communication timing through the real time region of each communication cycle. For example, data generated at random such as computer data is transmitted by random access through the random access region.

Consequently, both the real time data and random data such as computer data can be transmitted at every communication cycle. The real time data can be transmitted securely through the real time region at every communication cycle according to preliminarily allocated transmission order and the random data can be transmitted by random access through the random access region.

According to claim 20 of the present invention, there is provided a communication method according to claim 19 characterized in that the real time region is set up successively in the communication cycle corresponding to the communication order allocated while a remaining region of the communication cycle is used as the random access region.

According to the communication method described in claim 20, the real time region is set up successively in a communication cycle based on the data transmission timing allocated to the communication terminal transmitting data. Then, a region other than the real time region set up successively in each communication cycle is used as the random access region.

Consequently, the real time region and random access region are set up in each communication cycle, so that not only the real time data but also random can be transmitted at every communication cycle.

According to claim 21 of the present invention, there is provided a communication method according to claim 19 wherein if the real time data transmitted through the real time region is not received properly, the real time data not received properly is transmitted bi-directionally between the call terminal and a mating terminal which is the communication terminal, comprising: a calling step for the call terminal to call the mating terminal of an object by random access; a responding step for the mating terminal to respond to the call terminal when accepting a call from the call terminal; and a communication order allocation step for, if the response arise corresponding to the call, allocating communication orders for the call terminal and the mating terminal, each of the allocated communication orders being re-transmitted to other communication terminals sharing the channel.

According to the communication method described in claim 21, for example, the real time data, which cannot be received properly by a mating terminal because it is not transmitted to the mating terminal properly, is re-transmitted through the random access region. As a result, even if the real time data, which should be transmitted properly through the real time region, is not received based on the communication timing corresponding to the transmission order, by re-transmitting it through the random access region, the real time data can be transmitted securely to an object destination.

According to claim 22 of the present invention, there is provided a communication method according to claim 15 characterized in that the channel uses a carrier having a same predetermined frequency and detection of the empty time in the channel is carried out by detecting absence of the carrier.

According to the communication method described in claim 22, detection of the empty time is carried out by detecting a continuous time in which no signal of a predetermined frequency exists on a shared channel.

Consequently, data transmission from a communication terminal having a higher communication order than itself and presence/absence of the disturbing signal are detected, so that the empty time in which no signal exists on the shared channel can be detected securely.

According to claim 23 of the present invention, there is provided a communication method comprising:

a notifying step for plural communication terminals sharing a single channel to communicate bi-directionally between a call terminal which is the communication terminal for calling and a mating terminal which is the communication terminal called by the call terminal at a predetermined communication cycle while avoiding a collision of use of the channel with other communication terminals, an empty time setting step for setting the length of empty time in the channel capable of starting transmission of data corresponding to the allocated communication order in each of the communication terminals to which the communication order is allocated; and a data transmitting step for, if emptiness of the same length as the empty time set up in the empty time setting step is detected on the same channel in each of the communication terminals to which the communication order is allocated, transmitting data, the call terminal and the mating terminal executing bi-directional communication by executing transmission at timing each corresponding to the communication order at every communication cycle.

According to the communication method described in claim 23, when the call terminal receives a response to a call from the mating terminal, communication timings are allocated to both itself (the call terminal) and the mating terminal, so that the allocated communication timing is notified to each communication terminal through the notifying step.

In each of the communication terminals to which the communication order is allocated, the empty time on the same shared channel, at least necessary just before transmitting data, is set to be 50 μseconds, 100 μseconds and 150 μseconds for a communication terminal having the first communication order, a communication terminal having the second communication order and a communication terminal having the third communication order respectively. If emptiness of 50 μseconds is detected on the same shared channel, data transmission can be started from the communication terminal having the first communication order.

Even if the communication terminal having the first communication order does not transmit data although emptiness of 50 μseconds exists on the same channel, if further emptiness of 50 μseconds continues after the emptiness of 50 μseconds is detected so that emptiness of 100 μseconds continuous on the shared channel is detected, the communication terminal having the second communication order can transmit data.

Consequently, transmission procedure possessed by the communication system can be used effectively and each of the communication terminals can share the same channel without colliding with other communication terminals. Even if data transmission is disabled because a disturbing signal such as an external noise exists, after the disturbing signal disappears, bi-directional communication can be carried out between communication terminals while maintaining communication order. Therefore, for example, real time bi-directional communication such as telephone and TV telephone can be carried out.

According to claim 24 of the present invention, there is provided a communication method according to claim 23 further comprising:

a data transmission detecting step for detecting whether or not a communication terminal having a higher communication order than itself transmits data in each of the communication terminals to which the communication order is allocated; and an empty time reduction step for reducing the empty time set in the empty time setting step corresponding to the allocated communication order when it is detected that a communication terminal having a higher communication order than itself transmits data in the data transmission detecting step.

According to the communication method described in claim 24, if it is detected that data is transmitted from a communication terminal having a higher communication order than itself in each communication terminal through the data transmission detecting step, the empty time set in itself is reduced in the empty time reduction step.

Consequently, just after occupation of the same shared channel is released after data transmission from a communication terminal having a higher communication order is terminated or the disturbing signal disappears, the empty time can be always the shortest, so that bi-directional communication is enabled between the communication terminals. Further, a preliminarily allocated transmission order is maintained, so that appropriate data transmission can be carried out securely.

When transmitting a compressed signal by rate variable compression method, it is possible to cope with changes of the packet length due to deviation of the rate only by setting a channel corresponding to, for example, average transmission rate.

BRIEF DESCRIPTION OF DRAWINGS

FIG. 4 is a diagram for explaining transmission of the packet corresponding to communication timing.

FIG. 5 is a diagram for explaining operation of a communication terminal when a disturbing signal is generated during transmission of the packet.

FIG. 9 is a diagram for explaining a case where transmission timing of real time data is allocated fixedly.

FIG. 10 is a diagram for explaining a case where transmission timing of the real time data is allocated fixedly while a disturbing signal is mixed in the transmission path.

FIG. 13 is a diagram for explaining setting of carrier empty time corresponding to communication order carried out in a LAN unit shown in FIG. 12.

FIG. 14 is a diagram for explaining a processing for reducing the set carrier empty time.

FIG. 17 is a diagram for explaining transmission of the real time data carried out in the LAN system shown in FIG. 11.

BEST MODE FOR CARRYING OUT THE INVENTION

Hereinafter, an embodiment of the communication method, communication system and communication unit of the present invention will be described. The embodiment which will be described below is a case where the present invention is applied to LAN (Local Area Network) in which plural communication devices are connected by radio.

First Embodiment

[About One-Way Communication]

Figure 1:
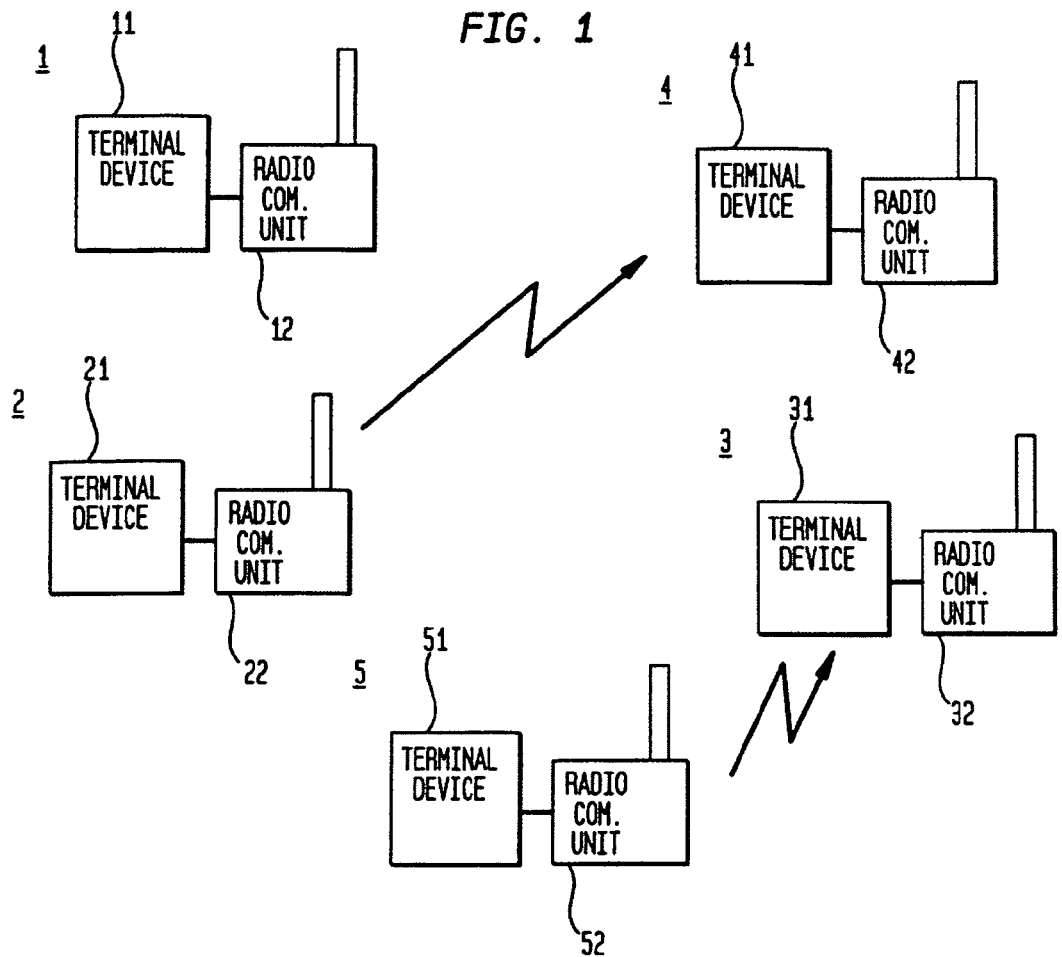
FIG. 1 is a diagram for explaining an embodiment of the communication system of the present invention.

FIG. 1 is a diagram for explaining the structure of LAN of this embodiment. The LAN for use in this embodiment has so-called Peer to Peer structure in which no server dedicated unit is provided and communication units connected to this network are on the same position.

In FIG. 1, terminal devices 11, 21, 31, 41, 51 are personal computers or work stations. Radio communication units (LAN unit) 12, 22, 32, 42, 52, which are communication terminals of this embodiment, are connected to these terminal devices 11, 21, 31, 41, 51 so as to form LAN terminal devices 1, 2, 3, 4, 5. As a result, communication is enabled between the respective LAN terminal devices.

In the LAN of this embodiment, the LAN terminal devices 1, 2, 3, 4, 5 use a transmission method like the CSMA method whereby the LAN devices receive and transmit data through packet transmission and detect a carrier prior to packet transmission in order to avoid a collision in transmission path.

The respective LAN terminal devices 1, 2, 3, 4, 5 connected to the LAN (network) of this embodiment detect presence or absence of carrier having a predetermined frequency for use for the packet transmission in the LAN of this embodiment prior to transmission of the packet. By this carrier detection, the respective LAN terminal devices detect whether the transmission path is on use or empty. If the transmission path is empty, the terminal device transmits the packet in order to avoid a collision of the packet transmission with the other LAN terminal device.

Figure 2:
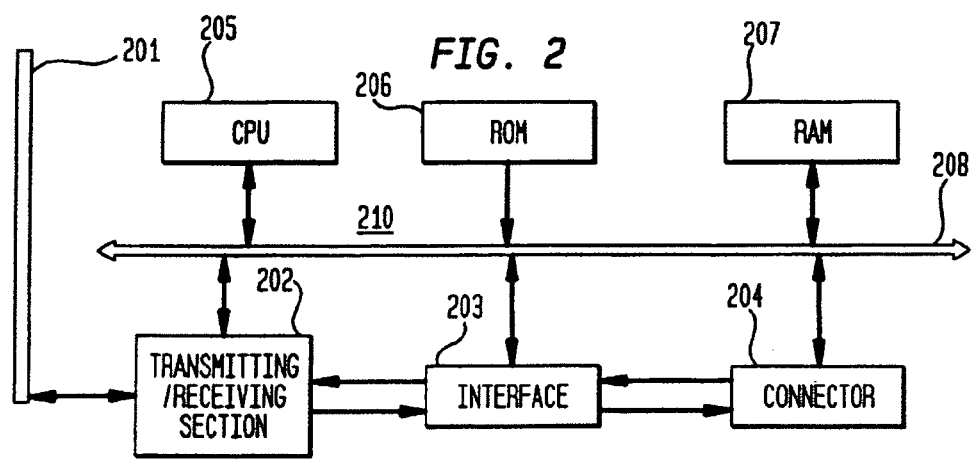
FIG. 2 is a block diagram for explaining a LAN unit (radio communication unit) of each LAN terminal device shown in FIG. 1.

FIG. 2 is a block diagram for explaining the LAN units 12, 22, 32, 42, 52 which are communication units of this embodiment. As shown in FIG. 2, each of the LAN units 12, 22, 32, 42, 52 comprises an antenna 201, a transmitting/receiving section 202, an interface section 203, a connector 204, a CPU 205, a ROM 206, RAM 207 and a bus 208.

The CPU 205, ROM 206, RAM 207 constitute a control section 210 of the LAN unit of this embodiment. The ROM 205 stores program and data necessary for processing and the RAM 206 is used as a working region.

As shown in FIG. 2, the transmitting/receiving section 202 and interface section 203 are connected to the control section 210 through a bus 208 so as to control these components. The connector 204 is for connecting the LAN unit of this embodiment to the terminal device.

According to this embodiment, the transmitting/receiving section 202 of the LAN unit detects a carrier as described above, and controls packet transmission timing and carries out transmission data modulation and received data demodulation in cooperation with the control section 210.

The interface section 202 enables exchange of data between the terminal device and the LAN (network) of this embodiment. According to this embodiment, as described later, the interface section 202 has a function for generating a transmission packet and disassembling a received packet.

An operation for transmitting or receiving data between the LAN terminal devices of this embodiment composed of the terminal device and LAN unit will be described. Here, a case where data is transmitted by radio by random access from the LAN terminal device 2 to the LAN terminal device 4 as indicated by an arrow in FIG. 1 will be described.

The terminal device 21 supplies data to be transmitted to the LAN terminal device 4, and information such as self address (self ID) and destination address (destination ID). Data from the terminal device 21 is supplied to the interface section 203 through the connector 204 of the LAN unit 22.

The interface section 203 forms a packet composed of a header including destination ID and self ID and data to be transmitted corresponding to control from the control section 210 and supplies it to the transmitting/receiving section 202. The transmitting/receiving section 202 generates a transmission signal by amplifying received transmission packet or other processing and transmits it through the antenna 201.

At this time, as described above, in the LAN unit of this embodiment, for example, the transmitting/receiving section 201 and the control section 210 detect the carrier to avoid a collision of packet transmissions, thereby detecting in advance that no carrier signal is received, and then transmits the packet when the transmission path is empty. If the transmission path is not empty, waiting condition is set up until the transmission path becomes empty. Upon transmission of the packet by random access, random waiting time may be sometimes necessary.

In the LAN terminal device 4, the packet transmitted by radio is received by the receiving section 202 through the antenna 1 of the LAN unit. According to the destination ID of the received packet, only packets transmitted for self are received and the received packets for self are supplied to the interface 203. The interface 203 disassembles the packets for self from the transmitting/receiving section 202 to extract data sent from the LAN terminal device 2. Then, the extracted data is supplied to the terminal device 41 through the connector 204.

Each of the LAN units 12, 22, 32, 42, 52 have a function which enables communication with the LAN terminal devices connected to the network by radio transmission.

According to this embodiment, each LAN terminal device communicates at a communication cycle of a predetermined length used in the LAN of this embodiment. Then, communication timing is allocated to a LAN terminal device to which real time data is intended to be transmitted within each communication cycle of the predetermined length. The LAN terminal device for transmitting real time data transmits the data at communication timing allocated to self in each communication cycle.

Data generated at random such as computer data (random data) is transmitted through a region (random access region) other than a region (real time region) for transmitting real time data according to allocated transmission timing within each communication cycle of a predetermined length. According to this embodiment, in this way, the LAN terminal devices 1, 2, 3, 4, 5 transmit real time data and random data through different regions in the same communication cycle.

As described later, each of the LAN terminal devices of this embodiment confirms whether or not the transmission path is empty prior to transmission of the packet if it intends to transmit real time data or data generated at random such as computer data and only if the transmission path is empty, transmits the packet in order to avoid a collision of transmission path use. As a result, both the real time data and random data can be transmitted to a destination.

Next, communication processing for transmission and reception of the packet carried out between the LAN terminal devices of this embodiment connected through the LAN will be described in detail. In a following description, a case where the LAN terminal device 2 transmits real time data to the LAN terminal device 4 while the LAN terminal device 5 transmits real time data to the LAN terminal device 3 as indicated by an arrow of FIG. 1 will be described.

Figure 3:
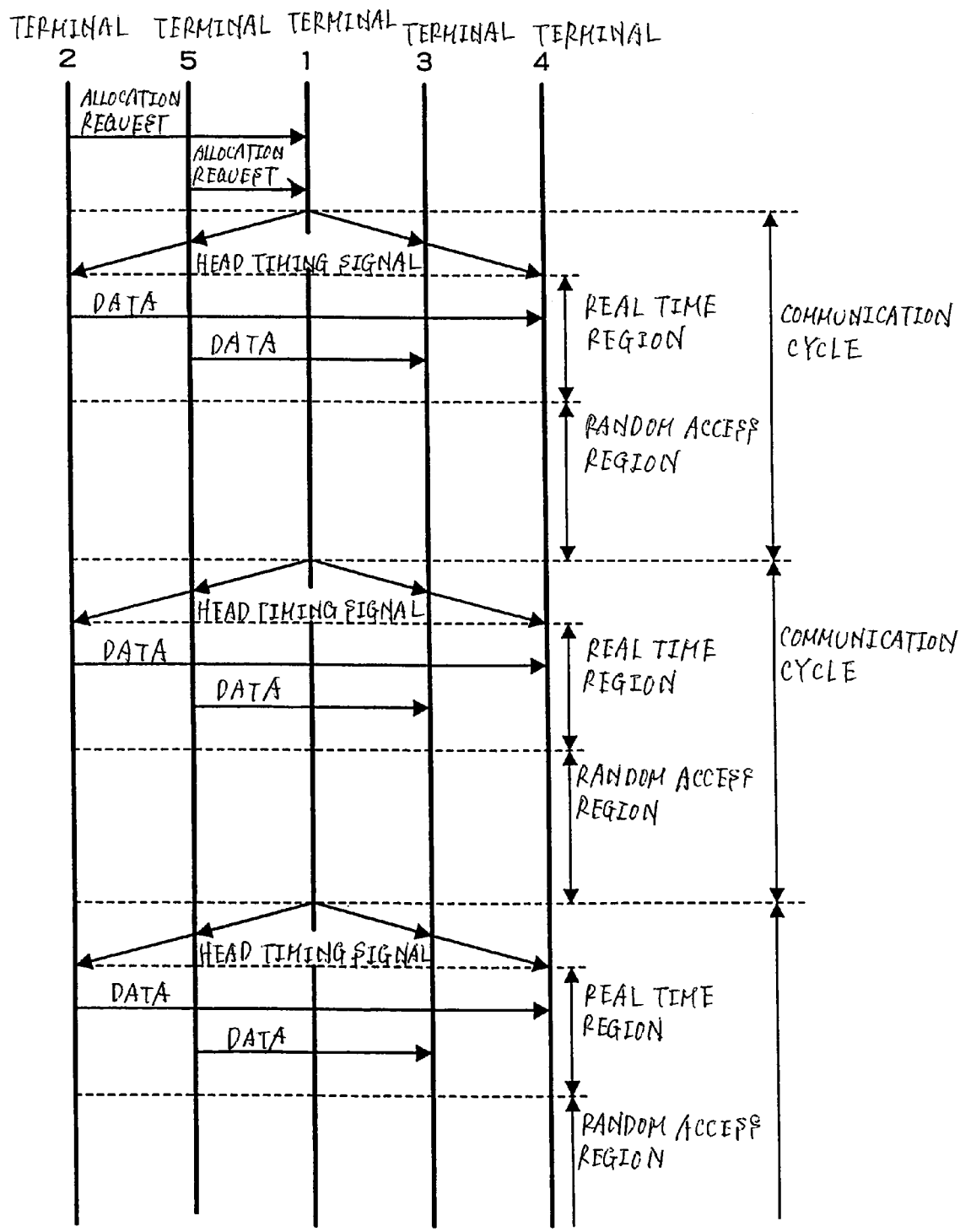
FIG. 3 is a diagram for explaining a processing for transmission of the real time data.

FIG. 3 is a diagram for explaining a processing for transmission of real time data according to this embodiment. According to this embodiment, the LAN terminal device 1 has a role of a communication control unit (control station) for controlling a communication cycle. Hereinafter, in this specification, a communication terminal called communication management unit or communication control unit is called control station.

The LAN terminal device 2 and LAN terminal device 5 intending to transmit real time data such as voice data make communication timing allocation requests as indicated in an upper section to the left of FIG. 3 and transmit them to the LAN terminal device 1 set up to act as a control station.

If the LAN terminal device 1 receives this communication timing allocation request, it allocates the communication timing to the LAN terminal device 2 and the LAN terminal device 5 corresponding to a received allocation request. According to this embodiment, transmission sequence is allocated within a communication cycle as the communication timing.

According to this embodiment, because the LAN terminal device 2 transmits an allocation request earlier than the LAN terminal device 5, the LAN terminal device 1 allocates communication timing to the LAN terminal device 2 to allow it to transmit real time data first within each communication cycle. Then, it allocates the communication timing to the LAN terminal device 5 to allow it to transmit real time data second.

The LAN terminal device 1 forms a head timing signal including information indicating the communication timings allocated to the LAN terminal device 2 and the LAN terminal device 5. As indicated by arrows drawn to the right and left from the LAN terminal device 1 in FIG. 3, this head timing signal is transmitted to all LAN terminal devices connected to the LAN of this embodiment at a head or just before the head of a communication cycle of a predetermined length.

The head timing signal is a packet which determines a communication cycle and transmitted to each LAN terminal device connected to the LAN of this embodiment at each communication cycle. Consequently, information about the head timing of each communication cycle and communication timing allocated to a LAN terminal device which made a request are notified to all communication terminals connected to the LAN of this embodiment. In the LAN of this embodiment, the network can be operated effectively by providing with the control station.

After the communication timing is allocated, the LAN terminal device 2 and the LAN terminal device 5 transmit real data to each transmission destination according to communication timing allocated to self within a communication cycle whose head position (head timing) is indicated by the head timing signal. In this case, a carrier is detected prior to transmission of the packet and if the transmission path is empty, the packet is transmitted.

If the transmission path is empty as a result of the carrier detection, as shown in FIG. 3, the LAN terminal device 2 to which the first of the communication timing is allocated transmits real time data to the LAN terminal device 4 at the (first) of the real time region in each communication cycle. Next, after the LAN terminal device 2 transmits real time data second, the LAN terminal device 5 to which the second of the communication timing is allocated transmits real time data to the LAN terminal device 3 through the real time region in each communication cycle.

Because as shown in FIG. 3, at the head of each communication cycle, the head timing signal including information indicating the communication timing is transmitted to each LAN terminal device, real time data packet is transmitted repeatedly through the real time region of each communication cycle indicated by the head timing signal based on information indicating the communication timing contained in the head timing signal, so that the real time data is transmitted periodically at each communication cycle.

According to this embodiment, the length of a communication cycle is predetermined. The length of this communication cycle is determined to be most appropriate length in the LAN (network) corresponding to various information such as the quantity of the LAN terminal devices connected to the same network, ratio between transmissions of real time data and random data and the like.

According to this embodiment, by allocating the communication timing corresponding to a communication timing allocation request, real time region is secured successively in each communication cycle and a remaining region securing the real time region is used as random access region in each communication cycle. In this case, the real time region and random access region can be changed within a communication cycle depending on the quantity of the LAN terminal devices for transmitting real time data.

If the length of a packet formed by a LAN unit of each LAN terminal device to transmit real time data is equal in every LAN unit, by allocating only the allocation order in the communication cycle to a requesting LAN terminal device, as described above such as first and second, each LAN unit receiving an allocation of the communication timing can be notified of its own transmission timing in each communication cycle.

That is, the LAN terminal device, to which the first of the communication timing is allocated, can recognize that just after the head timing signal is transmission timing allocated to itself. Each LAN terminal device, to which the second or the following of the communication timing is allocated, can detect its own communication timing from the head of a communication cycle by multiplying, for example, communication timing allocated to itself, in this case, order information with the length of a packet.

According to information sent from the LAN terminal device 1 which is a control station, respective LAN terminal devices connected to the same LAN (network) can know a head position of the communication cycle and transmission timing of a packet in the LAN terminal device including itself. According to this information, to where the real time region secured from the head position of each communication cycle is extended or from where the random access region begins can be known.

Of course, each LAN terminal device can change the length of a packet to be formed depending on the kind of real time data to be transmitted and the quantity of real time data which should be transmitted. In this case, communication timing of each LAN terminal device, end position of the real time region and the like can be detected accurately by, for example, transmitting the length of the packet formed by itself to the LAN terminal device 1 together with the allocation request from each LAN terminal device, so as to notify each LAN terminal device of the length of the packet to be transmitted through the LAN terminal device 1. Additionally, each LAN terminal device may notify other LAN terminal devices of the length of a packet to be formed by itself.

In this case, each LAN terminal device can know accurately from where to where in a region the LAN terminal device, which receives an allocation of the communication timing, transmits real time data. Further, each LAN terminal device can know to where the real time region for transmitting real time data depending on communication timing is extended and from where the random access region begins, according to the communication timing, the length of the packet, and the like.

In this way, the real time data can be transmitted accurately through the real time region of each communication cycle based on communication timing and random data such as computer data can be also transmitted through the random access region. That is, by providing with both the real time region and the random access region in a communication cycle, both the real time data and random data can be transmitted or received accurately and securely.

If according to this embodiment, for example, transmission of the real time data is completed or LAN unit user instructs to terminate real time data transmission, transmission completing instruction, transmission terminating instruction or the like is supplied from the LAN terminal device 2 or the LAN terminal device 5 to the LAN terminal device 1. Correspondingly, the LAN terminal device 1 releases the allocation of the communication timing, so that information indicating the communication timing allocated to the LAN terminal device which sends the transmission completing instruction, transmission terminating instruction and the like is erased from the head timing signal.

As a result, only information indicating communication timing relative to the LAN terminal device actually transmitting real time data is included in the head timing signal. Of course, by reallocating the communication timing, the real time region and the random access region can be set up effectively.

FIGS. 4, 5 are diagrams for explaining transmission of the packet from the LAN unit 22 and LAN unit 52 of this embodiment. The LAN unit 22 of the LAN terminal device 2 and the LAN unit 52 of the LAN terminal device 5 receive the head timing signal (FIG. 4A) from the LAN terminal device 1 operating as a control station and extracts information indicating communication timing allocated to itself contained in this head timing signal so as to know its own communication timing.

According to this embodiment, as described above, the first and second communication timings are allocated to the LAN terminal unit 2 and LAN terminal unit 5 respectively. The LAN unit 22 transmits a packet formed depending on data from the terminal unit 21 at the first timing allocated to itself. Prior to transmission of the packet, it confirms that the transmission path is empty by detecting a carrier and if the transmission path is empty, it transmits the packet to transmit real time data as shown in FIG. 4B.

Likewise, the LAN unit 52 of the LAN terminal unit 5 transmits a packet formed depending on data from the terminal device 51 at the second timing allocated to itself. Prior to the transmission of the packet, it confirms that the transmission path is empty by detecting the carrier and if the transmission path is empty, it transmits the packet from the real time data as shown in FIG. 4C. In this way, each terminal device, to which communication timing is allocated, transmits at the communication timing allocated to itself.

Because according to this embodiment, only the LAN terminal unit 1 serves as the control station and allocates communication timing to each LAN terminal device, the same communication timing is never allocated to plural LAN terminal devices in duplication.

Therefore, if the packet for carrying real time data is transmitted at timing corresponding to communication timing allocated to itself, it never collides with a packet of other LAN terminal devices connected to the LAN of this embodiment. However, it can be considered that there is a disturbing signal of the same frequency as that of carrier used in the LAN of this embodiment.

As described above, by detecting the carrier, it is confirmed that the transmission path is empty. Only if there is no disturbing signal and the transmission path is empty so that the packet can be transmitted securely, the packet is transmitted.

FIG. 5 is a diagram for explaining a case where there is a disturbing signal when the LAN terminal device 2 intends to transmit the packet at communication timing allocated to itself.

As shown in FIG. 5B, disturbing signal is generated near the head of each communication frequency. Therefore, the LAN unit 22 of the LAN terminal device 2 does not transmit any packet because the disturbing signal exists at timing just after (beginning (first) of each communication frequency) the head timing signal indicated by time points T1, T2 in FIG. 5B. In this case, the LAN unit 22 repeats to detect the carrier signal. After the disturbing signal is eliminated thereby detecting that the transmission path is empty, the LAN unit 22 transmits the packet immediately as shown in FIG. 5c.

If there is no disturbing signal because transmission of the packet from the LAN unit 22 is delayed, the LAN unit 52 cannot transmit the packet at the communication timing allocated to itself. However, because the LAN unit 52 also detects that the transmission path is empty by detecting the carrier, if it detects that the transmission path is empty after the packet is transmitted from the LAN unit 22, it immediately transmits the packet as shown in FIG. 5D.

Each of the LAN terminal devices connected to the LAN (network) transmits the packet only if the packet can be transmitted securely by detecting the carrier to confirm that the transmission path is empty. As a result, the reliability of the LAN of this embodiment can be intensified. Further, the packet is transmitted at a minimum interval if it is confirmed that the transmission path is empty by detecting the carrier, transmission of the packet is never delayed due to detection of the carrier, so that the packet can be transmitted securely and quickly.

The LAN terminal device connected to the LAN of this embodiment transmits so-called random data such as computer data through the random access region RM after the real time region RL for transmitting real time data corresponding to communication timing within each communication cycle as shown in FIGS. 4, 5.

When transmitting computer data (random data) such as a text type message and a program, real time characteristic is not such an important problem, different from real time data such as voice data. Therefore, the computer data only needs to be transmitted securely to a destination and capable of being used by user as required.

If the random data is transmitted through the random access region RM, it never disturbs transmission of the real time data and the random data can be transmitted securely to a destination.

If transmission of the real time data is suspended because a random access signal (disturbing signal) is mixed in real time region, priority is applied corresponding to transmission timing (transmission order) in order to continue normal transmission of the real time data. Transmission of the real time data can be continued corresponding to this priority after the disturbing signal is eliminated.

Figure 6:
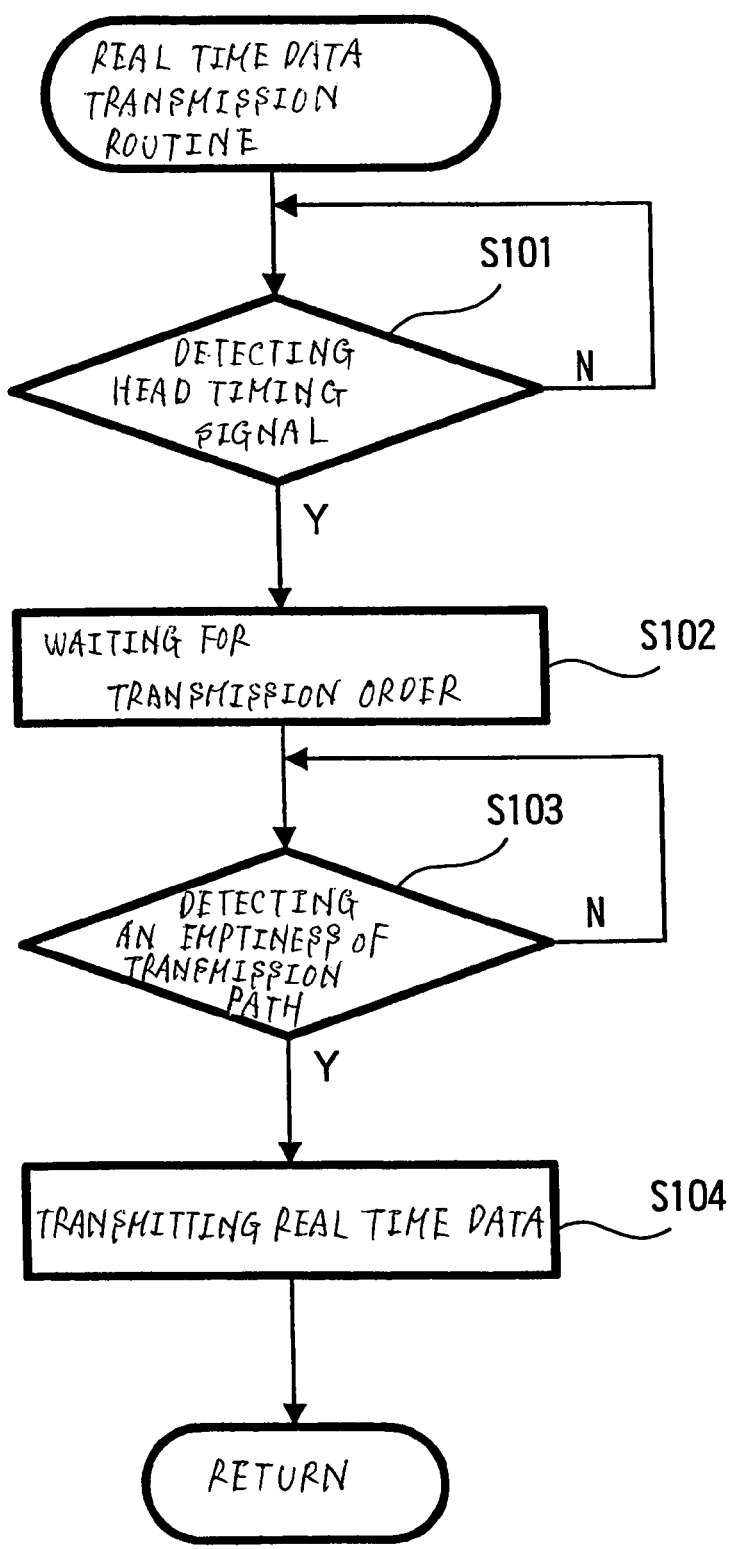
FIG. 6 is a flow chart for explaining an operation of communication terminal when transmitting real time data.

An operation of the LAN terminal device for transmitting real time data will be described with reference to a flow chart of FIG. 6. The processing shown in the flow chart of FIG. 6 is a processing which can be executed after communication timing allocation request is transmitted to the LAN terminal device 1 which is a control station, in the LAN terminal device intending to transmit the real time data. This processing is carried out by the LAN terminal device 2 and LAN terminal device 5 in the aforementioned example.

After receiving the communication timing allocation request, the LAN unit 22 of the LAN terminal device starts the processing shown in FIG. 6. First, whether or not the head timing signal is transmitted from the LAN terminal device 1 as the control station is determined (step S101) and waiting condition is kept until the head timing signal is detected.

If it is determined that the head timing signal is transmitted in determining processing of step S101, communication timing allocated to itself is detected based on information indicating communication timing contained in the head timing signal and waiting condition for transmission of the packet is kept until communication timing allocated to itself is arrived at (step S102).

If the communication timing allocated to itself is reached, whether or not a transmission path for transmitting the packet is empty is determined by detecting a carrier (step S103). If it is determined that the transmission path is not empty in the determining processing of step S103, the determining processing of step S103 is repeated to wait for the transmission path to be empty. If it is determined that the transmission path is empty without detecting any carrier in step S103, a packet formed to transmit the real time data is transmitted (step S104).

According to this embodiment, after the packet for transmitting real time data is not transmitted by the processing of step S104, processing is returned to main processing routine. However, if all object real time data is transmitted, the processing shown in FIG. 6 is repeated, so that the packet is transmitted at communication timing allocated to itself through a real time region of each communication cycle. Consequently, the real time data can be transmitted to an object destination accurately and securely.

[Re-Transmission of Real Time Data]

A packet transmitted through a real time region of each communication cycle may not reach a destination because it is affected by a disturbing signal, for example. For the reason, according to this embodiment, if the packet transmitted by itself is not transmitted to the destination properly or if the packet is not received properly by the destination, each LAN terminal device re-transmits that packet.

Figure 7:
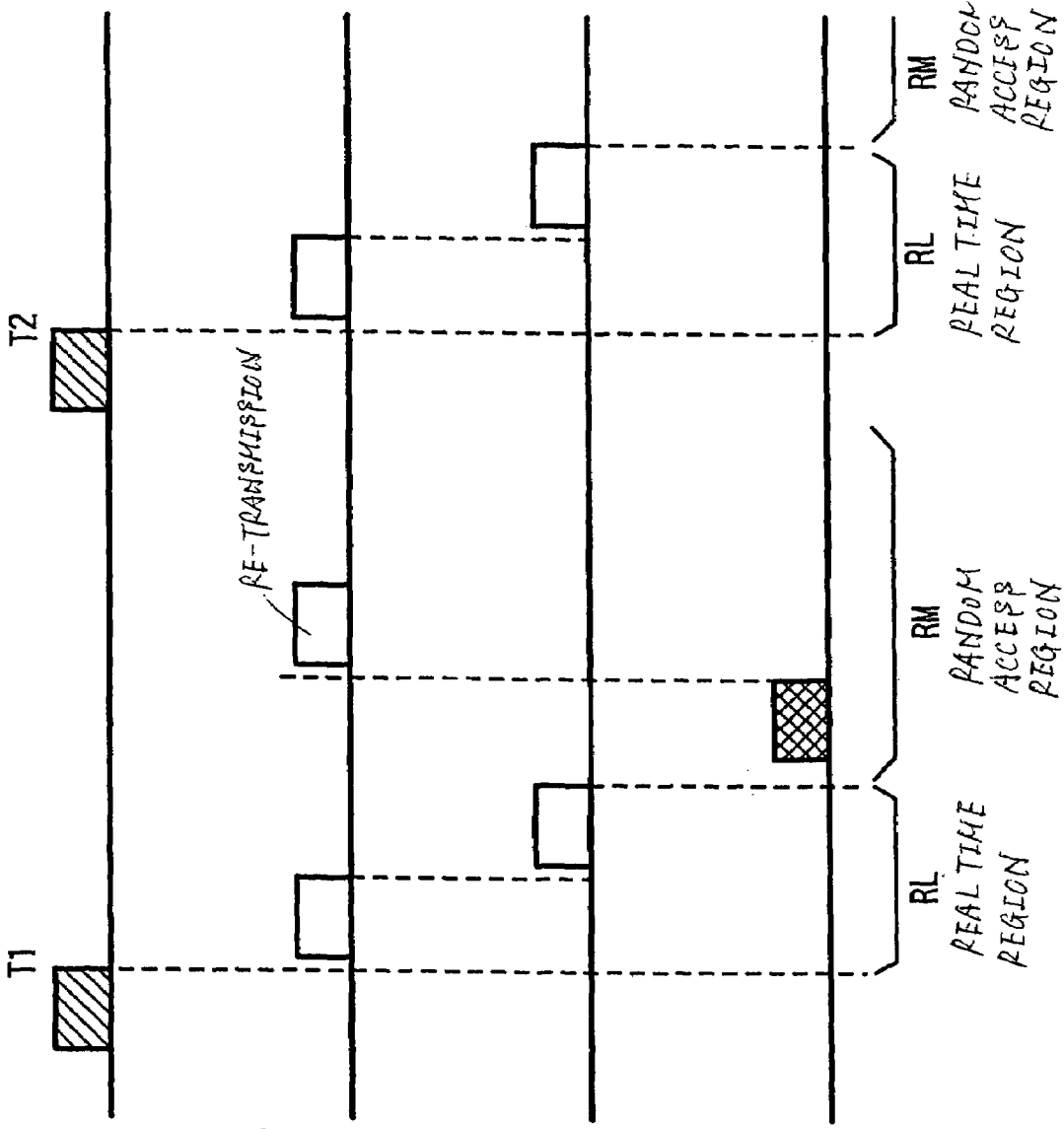
FIG. 7 is a diagram for explaining re-transmission of real time data.

FIG. 7 is a diagram for explaining re-transmission of the packet according to this embodiment. In this case also, a case where real time data is transmitted from the LAN terminal device 2 to the LAN terminal device 4 while the real time data is transmitted from the LAN terminal unit 5 to the LAN terminal unit 3 will be described.

As described above and shown in FIGS. 7B, 7C, the LAN terminal device 2 and LAN terminal device 5 transmit the packet (real time data) to the object LAN terminal device 4 and LAN terminal device 3 based on communication timing allocated to themselves contained in the head timing signal by the LAN terminal device 1 at each communication cycle whose head is indicated by the head timing signal.

As described above, each LAN terminal device can know the size of the real time region based on the communication timing allocated to each LAN terminal device contained in the head timing signal, the length of the packet or the like. If a packet which should be transmitted properly is not transmitted through the real time region, the LAN unit 42 of the LAN terminal device 4 can detect this phenomenon according to a call signal from the LAN unit 22 of the LAN terminal device 2.

If the LAN unit 42 detects that a packet which should be transmitted properly from the LAN unit 22 is not transmitted, as shown in FIG. 7D, a non-arrival notice which notifies that no packet is transmitted is formed in the random access region RM belonging to the same communication cycle as the real time region RL through which a packet for itself is to be transmitted and this notice is transmitted to the LAN unit 22.

Then, the LAN unit 22 which receives the non-arrival notice for itself detects the carrier immediately so as to detect an empty space of transmission path in the random access region. Then, it transmits the packet transmitted through the real time region again through the random access region. For the reason, the LAN unit 22 of this embodiment holds the packet transmitted through the real time region of the communication cycle at every communication cycle and stands by for re-transmitting it.

According to this embodiment, if a packet transmitted through the real time region of each communication cycle is not transmitted properly or the transmitted packet is not received properly by a destination so that a non-arrival notice is transmitted from that destination, that real time data not received is transmitted again by random access through the random access region of the same communication cycle.

Therefore, even if the packet for transmitting the real time data is not received properly, the real time data can be transmitted again without damaging the real time characteristic of the real time data. Thus, quality of the real time data is never deteriorated.

[About Bi-Directional Communication]

In the above described embodiment, a case where data is transmitted in a single direction from the LAN terminal device 2 to the LAN terminal device 4 or from the LAN terminal device 5 to the LAN terminal device 3 has been described about communication method, communication system and communication terminal of the present invention. However, the present invention can be applied to bi-directional communication used in for example, TV or TV telephone. Hereinafter, a case of the bi-directional communication will be described.

The case for carrying out bi-directional communication will be described assuming that the LAN terminal device comprised of the LAN (network), terminal device and LAN unit of this embodiment are employed, with reference to FIGS. 1, 2. In the case of the bi-directional communication also, the structures of the LAN, terminal device and LAN unit described with reference to FIGS. 1, 2 are not different.

Figure 8:
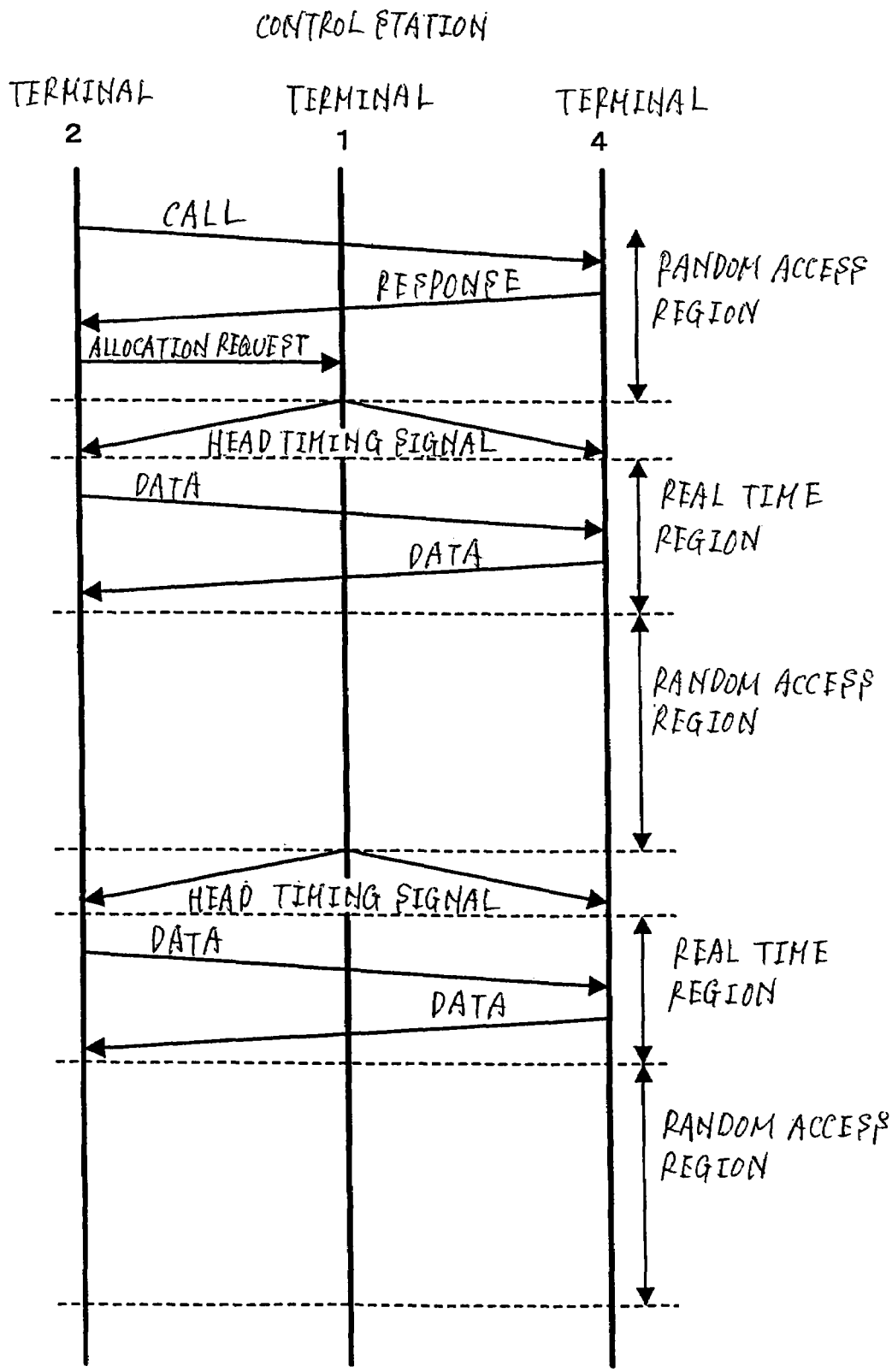
FIG. 8 is a diagram for explaining bi-directional communication of real time data.

FIG. 8 is a diagram for explaining an operation of the LAN terminal device connected to the LAN of this embodiment in case of carrying out the bi-directional communication. FIG. 8 shows a case where the bi-directional communication is carried out between the LAN terminal device 2 and the LAN terminal device 4 and an example of case where the LAN terminal device 4 is called from the LAN terminal device 2.

A communication request (call request) to the LAN terminal device 4 from a user, accepted through the terminal device 21 of the LAN terminal device 2 is supplied to an interface section 203 of the LAN unit 22 through the connector 204 of the LAN unit 22. As indicated on topmost of FIG. 8, the interface section 203 forms a call signal to the LAN terminal device 4 and transmits this to the LAN terminal device 4 through the transmitting/receiving section 202 and the antenna 201.

If the LAN unit 42 of the LAN terminal device 4 receives a call signal for itself through the antenna 201 and transmitting/receiving section 202, it supplies this to the terminal device 41 through the interface section 203 and the connector section 201. Then, the terminal device 41 notifies user that such a call is received by ringing a bell, for example or indicating a message on a display connected to the terminal device corresponding to a call signal for itself.

If user operates the terminal device 41 so as to respond to a call supplied from the LAN terminal device 2, instruction information is supplied from the terminal device 41 to the LAN unit 42 to urge the LAN unit 42 to respond to such a call. Based on this instruction information, the interface section 203 of the LAN unit 42 forms a response (response information) to be sent back to the LAN unit 22 and transmits it to the LAN unit 22 of the LAN terminal device 2 through the transmitting/receiving section 202 and the antenna 201.

If the LAN unit 22 of the LAN terminal device 2 receives a response from the LAN unit 42 of the LAN terminal device 4, it forms a request to allocate communication timing to both itself (LAN terminal device 2) and the LAN terminal device 4 and sends it to the LAN terminal device 1 which operates as a control station.

Corresponding to this allocation request, the LAN terminal device 1 allocates transmission order in each communication cycle to the LAN terminal devices 2, 4 as communication timing. In this example, the LAN terminal device 1 allocates communication timing for transmitting data first of each communication cycle to the LAN terminal device 2 which calls. Further, the LAN terminal device 1 allocates data transmission timing for transmitting data second of each communication cycle to the destination terminal device 4.

Like the case of communication in the single direction described above, the LAN terminal device 1 transmits a head timing signal including information indicating communication timing to all the plural LAN terminal devices connected to the LAN of this embodiment at each head of communication cycles having a predetermined length.

Each LAN terminal device knows communication timing allocated to the head of each communication cycle and each LAN terminal device from the head timing signal sent from the LAN terminal device 1. In each communication cycle, each LAN terminal device transmits real time data from itself at communication timing allocated to itself.

Therefore, if the head timing signal is transmitted from the LAN terminal device 1 to each LAN terminal device as shown in FIG. 8, the LAN unit 22 of the LAN terminal device 2 assigned to transmit real time data first of a communication cycle transmits the real time data such as voice data at the first timing just after the head to the LAN terminal device 4 within each communication cycle.

Then, the LAN unit 42 of the LAN terminal device 4 assigned to transmit the real time data second of the communication cycle transmits the real time data such as voice data at the second timing which is a next timing from the LAN terminal device 2 to the LAN terminal device 2 within each communication cycle.

The LAN terminal device 4 reproduces voice data which is real time data sent from the LAN terminal device 2 at real time so that it can be heard, and the LAN terminal device 2 reproduces voice data which is real time data sent from the LAN terminal device 4 at real time so that it can be heard.

Then, as shown in FIG. 8, transmission and reception of real time data such as voice data are repeated between the LAN terminal device 2 and the LAN terminal device 4 alternately based on the head timing signal supplied from the LAN terminal device 1, which is a communication control unit, at real time in each communication cycle, so that communication is carried out at real time.

By receiving an allocation of the communication timing, the other communication terminals than the LAN terminal device 2 and LAN terminal device 4 can transmit or receive real time data through the real time region. Further, like the case of communication in the single direction described above, the random data such as computer data can be transmitted by random access through the random access region in each communication cycle.

In case of the bi-directional communication also, if the real time data cannot be transmitted properly through the real time region, the real time data can be transmitted securely by transmitting the data again through the random access region after the real time region.

Re-transmission of the real time data is carried out in the following case. Like the case of communication in the single direction described above, if the LAN terminal device 4 detects that the packet which should be transmitted from the LAN terminal device 2 is not transmitted, the LAN terminal device 4 transmits a non-arrival notice to the LAN terminal device 2 through the random access region just after the real time region in which the real time data which should be received cannot be received.

The LAN unit 2 may hold real time data (packet) transmitted through the real time region just before, for example, and re-transmit the real time data (packet), which was transmitted through the real time region just before and held currently, if it receives a non-arrival notice.

In case of carrying out bi-directional communication as well, by providing with real time region for transmitting real time data at allocated communication timing and random access region for transmitting random data, the real time data can be transmitted or received securely and accurately without losing real time characteristic. Further, the random data can be transmitted or received through the random access region.

Even if it is intended to transmit real time data or random data, a collision of use of the transmission path can be avoided by detecting the carrier. For example, in case where the LAN terminal device which does nothing but random access is connected also, the terminal device can coexist with that device. This can be said in case of the aforementioned communication in the single direction.

Although according to the first embodiment, the real time region is set up successively in a communication cycle by allocating communication timing and then the remaining portion of the communication cycle in which the real time region is set up is used as the random access region, the present invention is not limited to this.

It is permissible to set up a ratio between the real time region and random access region preliminarily in a communication cycle. For example, ⅔ of a communication cycle may be set up as real time region while ⅓ of the communication cycle may be set up as random access region in advance. Further, the real time region and random access region may be set up alternately in a communication cycle.

In the above described embodiment, it is assumed that the LAN terminal device 1 is operated as a communication control unit (control station). However, a LAN terminal device, which is turned on first and connected to a network when any LAN terminal device is not powered on and not connected to the network, may be operated as the communication control unit.

In this case, each of communication terminals as plural LAN terminal devices connected to the network only has to be provided with a function as the communication control unit and capable of acting as the communication control unit. Of course, the LAN terminal device which acts as the communication control unit can also transmit or receive data.

This is the same as in the embodiment described previously. The LAN terminal device 1 acting as the communication control unit can transmit real time data or random data from itself or transmit or receive data bi-directionally. In this case, for example, the LAN terminal device 1 may set up its own communication timing by itself and notify other communication terminals thereof.

It is permissible to provide the network with a dedicated server which acts as only the communication control unit and control communication among plural communication control terminals by this dedicated communication control unit.

Further, a communication terminal intending to communicate can also allocate communication timing to itself and notify plural communication terminals connected to the same LAN of this allocated communication timing so as to establish its own communication timing. In this case, by various methods. are employed. For example, at the head of the communication cycle respective communication terminals control a common time and a communication cycle is specified with reference to this common time. Or upon connection to the network, a synchronization for the communication cycle is obtained among the respective communication terminals.

Second Embodiment

According to the aforementioned first embodiment, each LAN terminal device avoids a collision of use of the transmission path by detecting a carrier and if there is no carrier, transmits real time data at transmission timing allocated preliminarily and fixedly for each LAN terminal device in a communication cycle. And each LAN terminal device carries out random access in an interval in which no transmission timing is allocated in each communication cycle.

However, according to the method explained in the first embodiment, if there is a LAN terminal device incapable of transmitting the packet at allocated transmission timing because of mixing of disturbing signal in the transmission path, there is a possibility that collision of use of the transmission path cannot be prevented among the LAN terminal devices located subsequent to that LAN terminal device.

In the LAN system of the first embodiment described with reference to FIG. 1, it is assumed, for example, that timing t1, which is the first transmission timing in a communication cycle, is allocated to the LAN terminal device 2 as shown in FIG. 9 and that timing t2, which is the second transmission timing in the communication cycle, is allocated to the LAN terminal device 5.

In a case shown in FIG. 9, any carrier is not detected. If the transmission path is empty, a packet is transmitted from the LAN unit 22 of the LAN terminal device 2 at timing t1 of each communication cycle as shown in FIG. 9B. As shown in FIG. 9B, a packet is transmitted from the LAN unit 52 of the LAN terminal device 5 at timing t2 of each communication cycle as shown in FIG. 9B.

However, if a disturbing signal (FIG. 10B) is mixed in the transmission path just after the head timing signal (FIG. 10A) is transmitted as shown in FIG. 10, the LAN unit 22 of the LAN terminal device 2 detects a carrier so as to find out that the transmission path is not empty and therefore, a waiting condition is arisen until the transmission path becomes empty.

If an emptiness of the transmission path is detected in the LAN unit 22 such that a point of time when a packet is intended to be transmitted happens to be of the same timing as transmission timing t2 allocated to the LAN terminal device 5 as shown in FIGS. 10C, D, a packet transmitted from the LAN terminal device 2 collides with a packet transmitted from the LAN terminal device 5.

In case of an example shown in FIG. 10, a packet sent from the LAN terminal device 5 is transmitted earlier than the packet from the LAN terminal device 2 because of a slight deviation of timing so that the transmission order of the packet may be disturbed. In this case, appropriate transmission and reception of the real time data is disabled.

Therefore, according to the second embodiment, a collision of use of the transmission path is prevented securely and the sending order of the packets from plural LAN terminal devices is maintained appropriately so as to enable the real time data to be transmitted or received securely. Hereinafter, the second embodiment of the present invention will be described below.

Figure 11:
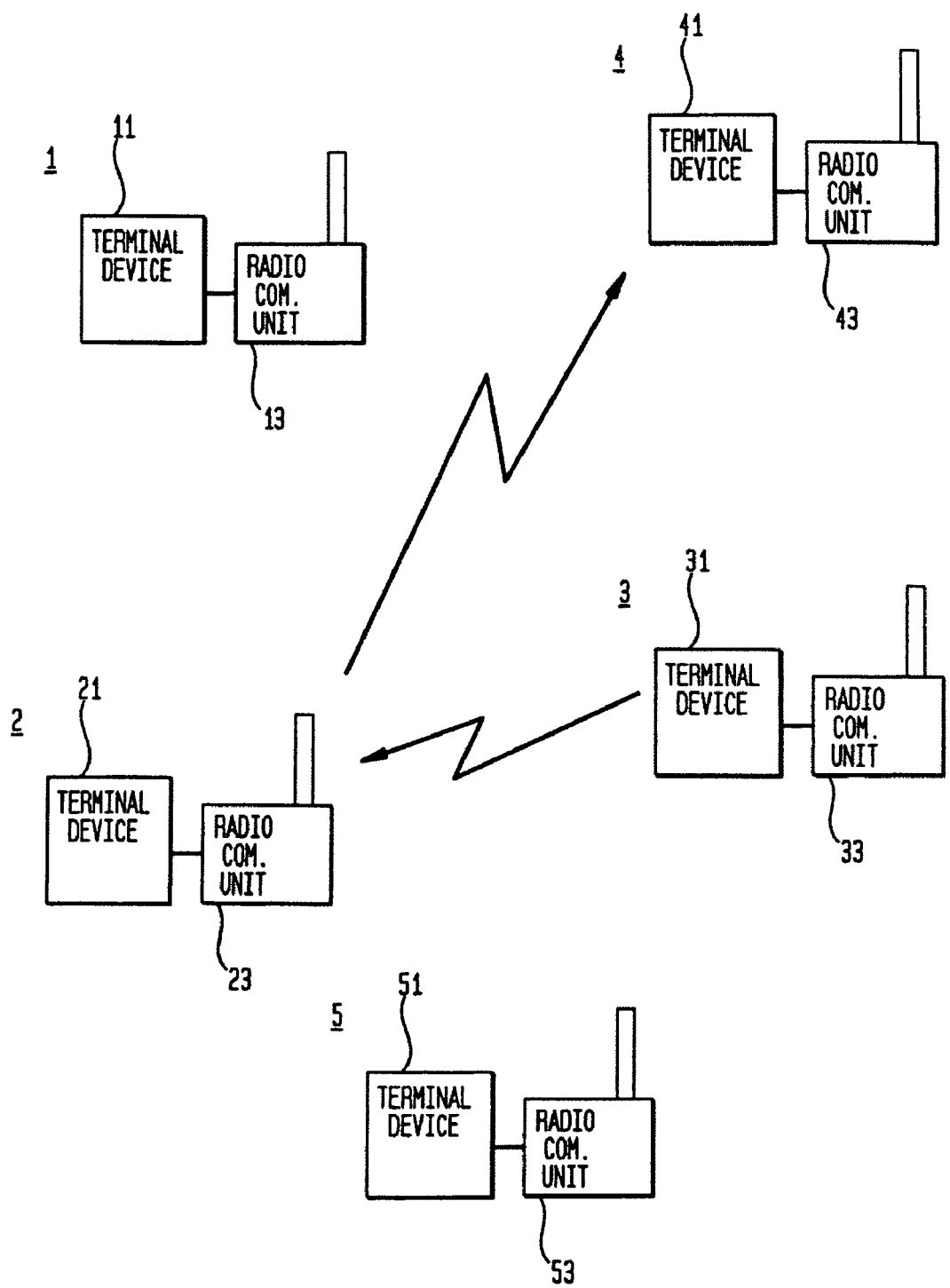
FIG. 11 is a diagram for explaining another embodiment of a communication system of the present invention.

FIG. 11 is a diagram for explaining the structure of the LAN according to the second embodiment. Like the LAN system of the first embodiment already described with reference to FIG. 1, the LAN of the second embodiment has so-called Peer to Peer LAN structure that it has no dedicated server and respective communication devices connected to the network stand on the same position.

In respective LAN terminal devices 1-5, like the LAN terminal devices 1-5 of the first embodiment described previously, terminal devices 11, 21, 31, 41, 51 like personal computers and radio communication units (LAN units) 13,

23, 33, 43, 53 which are communication terminals of this embodiment corresponding to each terminal device are provided.

In the LAN system of the second embodiment formed of these LAN terminal devices 1-5, like the LAN system of the first embodiment described previously, each of the LAN terminal devices 1-5 uses carrier of a predetermined frequency and a common transmission path so as to transmit various kinds of data through packet.

In the second embodiment also, as described later, each of the LAN units 13, 23, 33, 43, 53 connected to the respective LAN terminal devices detects a carrier before transmitting the packet so as to avoid a collision of use of the transmission path.

Figure 12:
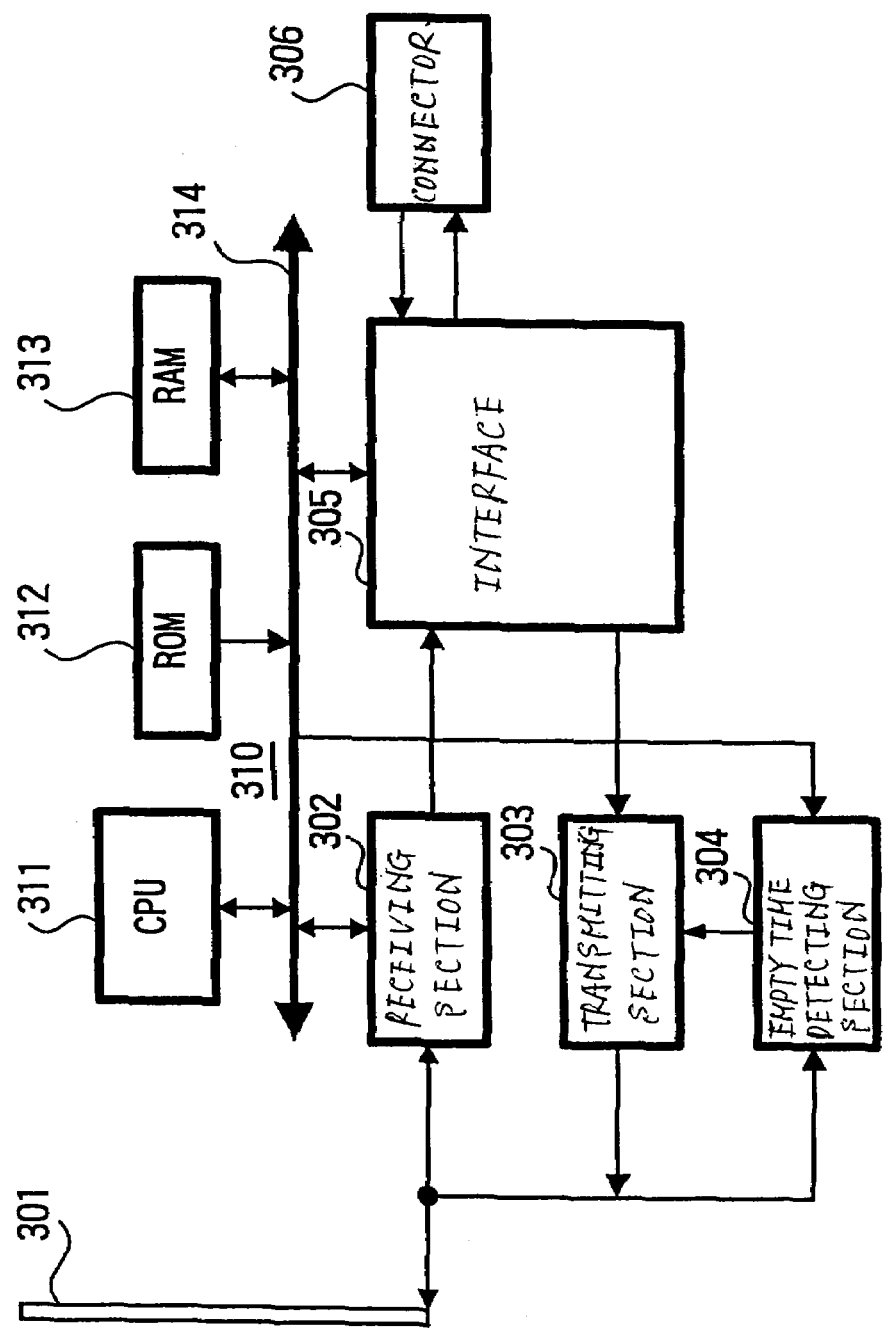
FIG. 12 is a block diagram for explaining LAN unit (radio communication unit) of each LAN terminal device shown in FIG. 11.

FIG. 12 is a block diagram for explaining the LAN units 13, 23, 33, 43, 53 of the second embodiment. That is, according to the second embodiment, each of the LAN units 13, 23, 33, 43, 53 have the structure shown in FIG. 12.

As shown in FIG. 12, each of the LAN units 13, 23, 33, 43, 53 of the second embodiment comprises an antenna 301, a receiving section 302 of radio signal, a transmitting section 303 of radio signal, a carrier empty time detecting section (empty time detecting section in FIG. 12) 304, an interface section 305, a connector 306, a CPU 311, a ROM 312, a RAM 313 and a bus 314.

The CPU 311, ROM 312 and RAM 313 connected through the bus 314 compose a control section 310 for the LAN unit of the second embodiment. Here, the CPU 311 is a central operation unit, the ROM 312 is a read only memory which stores programs and the RAM 313 is a random access memory for temporary storage, used as a working area.

Like the control section 210 of the LAN unit of the first embodiment, the control section 310 is connected to the receiving section 302, the carrier empty time detecting section 304 and the interface section 305 through the bus 314 so that these can be controlled by the bus 314. Further, the control section 310 can obtain necessary data of data received by the receiving section 302 described later from the receiving section 302 and be supplied with control information from the terminal device through the interface section 305.

The receiving section 302 demodulates packets received through the antenna 301 and supplies it to the interface section 305. The receiving section 302 extracts data necessary for control of the LAN unit from the demodulated received packet and supplies it to the control section 310. The transmitting section 303 is supplied with transmission data from the interface section 305 and modulates it and then transmits it to a transmission path through the antenna 301.

The carrier empty time detecting section 304 detects presence or absence of radio signal on the transmission path by monitoring received power and if emptiness longer than a predetermined time length on the transmission path is detected, controls the transmitting section 303 so as to transmit the transmission packet. That is, the carrier empty time detecting section 304 has a function as data transmission control means for controlling transmission timing of the transmission packet.

Like the interface section 202 of the LAN unit of the aforementioned first embodiment, the interface section 305 enables exchange of data between the terminal device and the LAN (network) of the second embodiment. It has a function for generating the transmission packet and disassembling a received packet and can supply control information from the terminal device to the control section 310. The connector 306 is used for connecting the LAN unit to the terminal device.

An operation for transmission and reception of data between the terminal devices of the second embodiment formed of the terminal devices and the LAN units will be described. First, an operation for transmitting data by radio by random access will be described about a case of transmitting data from the LAN terminal device 2 to the LAN terminal device 4 by radio.

When transmitting data from the LAN terminal device 2 to the LAN terminal device 4 by random access in FIG. 11, first, a transmission instruction and transmission data containing necessary information such as an address (self ID) of the LAN terminal device 2 and a destination address (destination ID) are supplied from the terminal device 21 to the LAN unit 23.

The transmission instruction supplied to the LAN unit is supplied to the control section 310 through the interface section 305. If the transmission instruction is supplied, the control section 310 controls the interface section 305, so that the transmission packet is formed corresponding to transmission data from the terminal device 21.

At the same time, the control section 310 specifies a carrier empty time on the transmission path which must be recognized (secured) prior to transmission of the transmission packet in order to avoid a collision of use of the transmission path. This carrier empty time indicates a time interval between the transmission termination time of a packet transmitted to the transmission path just before the packet is transmitted from the LAN unit and the packet transmitted from that LAN unit. The shorter this carrier empty time is, the more easily a packet can be transmitted from itself, just after a packet is transmitted to the transmission path from another LAN terminal device.

As described above, the carrier empty time detecting section 304 detects emptiness on the transmission path by monitoring received voltage and counts time in which the transmission path is empty from a point of time when transmission of a preceding packet is terminated. As described above, if emptiness corresponding to empty time set up by the control section 310 is detected, it is judged that the transmission path is empty. Then, the transmitting section 303 is controlled so that the transmission packet formed by the interface section 305 is transmitted to the transmission path through the transmitting section 303 and antenna 301. Consequently, the transmission packet from the LAN terminal device 2 is transmitted to the LAN terminal device 4.

The LAN unit 43 of the LAN terminal device 4 receives only a packet having its own address as a destination ID and supplies it to the interface section 305 of the LAN unit 43. The interface 305 disassembles the packet received from the receiving section 302 and supplies main information such as computer data to the terminal device 41 through the connector 306. Consequently, data from the LAN terminal device 2 is supplied to the LAN terminal device 4, so that this data becomes available in the LAN terminal device 41 of the LAN terminal device 4.

Because the carrier is detected prior to transmission of the packet, although random waiting time is sometimes required, random data such as computer data can be transmitted without any problem. However, under this condition, real time data, which must be transmitted periodically such as voice and animation, cannot be transmitted. As described previously with reference to FIGS. 9, 10, sometimes a collision of use of the transmission path cannot be prevented securely if nothing but allocation of the transmission timing fixedly is done.

For the second embodiment, communication order for transmitting real time data is allocated preliminarily to a LAN terminal device intending to transmit the real time data, so that real time data packet can be transmitted without disturbing the communication order corresponding to the preliminarily allocated communication order while detecting emptiness on the transmission path at the time of transmission of the packet.

As described above, transmission condition of a packet before a self communication order is always recognized to minimize an empty time for recognizing emptiness on the transmission path and transmission timing of self packet is automatically adjusted corresponding to the transmission condition of the packet.

As a result, when transmitting real time data such as voice and animation by means of the packet, if there is other communication devices or noise sources on the transmission path, the packet is transmitted while avoiding those to prevent a collision of use of the transmission path. Even after the collision of use of the transmission path is avoided, the transmission of the packet is always achieved at optimum timing without disturbing the communication order of the packets by exchange of the communication order to transmit the real time data properly.

Next, an operation for transmitting real time data such as voice and animation by means of the packet under the second embodiment will be described. Hereinafter, as indicated by arrows in FIG. 11, it is assumed that requests for transmission of real time data from the LAN terminal device 2 to the LAN terminal device 4, from the LAN terminal device 3 to the LAN terminal device 2 and from the LAN terminal device 5 to the LAN terminal device 3 are made.

According to the second embodiment also, like the first embodiment described previously, the LAN terminal device 1 operates as a control station to allocate communication order of real time data corresponding to a request from the LAN terminal device intending to transmit the real time data and then, transmit the allocated communication order through a head timing signal in order to notify each of the LAN terminal devices of the communication order for the real time data.

The head timing signal sent from the LAN terminal device 1 operating as a control station is a signal indicating the head of a communication cycle of a predetermined length like the first embodiment described previously and contains information indicating the length of the packet transmitted from each LAN terminal device.

Therefore, if the LAN terminal device transmits a request for allocation of communication order for real time data, by receiving the head timing signal from the LAN terminal device 1, each LAN terminal can know communication order allocated to itself.

According to communication order allocated to each LAN terminal device contained in the head timing signal from the LAN terminal device 1 and information indicating the packet length of the real time data, each LAN terminal device can know ranges of real time region RL in a communication cycle and random access region RM other than the real time region RL in a communication cycle clearly.

If the LAN unit 23 receives a connection request (real time data transmission request) for connecting to the LAN terminal device 4 from the terminal device 21, it transmits a communication order allocation request to the LAN terminal device 1 operating as a control station by random access like the first embodiment described previously.

According to the second embodiment, the LAN terminal device 1 allocates the first communication order for the real time data to the LAN terminal device 2 corresponding to a communication order allocation request from the LAN terminal device 2 and then, the allocated communication order and information indicating the packet length of real time data transmitted from the LAN terminal device 2 are transmitted through the head timing signal.

By receiving this head timing signal, the LAN terminal device 2 knows a communication order (first) allocated to itself and each LAN terminal device other than the LAN terminal device 2 come to know what communication order is allocated to the LAN terminal device 2. Likewise, according to the second embodiment, corresponding to communication order allocation request from each LAN terminal device, the second communication order is allocated to the LAN terminal device 3 and the third communication order is allocated to the LAN terminal device 5, so that these are notified to each LAN terminal device through the head timing signal.

The LAN terminal devices 2, 3, 5 in this embodiment transmit the packet corresponding to communication order allocated to themselves with reference to the head timing signal. That is, each LAN terminal device intending to transmit real time data can know its own timing for transmitting the packet in each communication cycle based on communication order notified through the head timing signal and the length of packet transmitted from each LAN terminal device, so that the packet can be transmitted corresponding to the allocated communication order.

In this case, although emptiness of the transmission path is detected prior to transmission of the packet as described above, the packet can be transmitted securely because the packet is sent at a minimum interval. A section to which a timing having an allocation of communication order or a transmission timing for the real time data is not allocated can be used as the random access region, and it can coexist with other communication devices for carrying out only random access.

Further, even if random data of other communication devices interrupt real time region to which communication order is assigned, a collision is avoided by detecting emptiness of the transmission path. At a minimum interval or if the interruption data disappear from the transmission path, the packet can be transmitted at a minimum interval after the disappearing.

According to the second embodiment, by changing the transmission path carrier empty time to be secured prior to transmission of the packet to the transmission path, corresponding to a communication order allocated to itself, in each LAN terminal device to which a communication order is allocated, even if some LAN terminal device cannot transmit the packet at proper timing because a disturbing signal is mixed in the transmission path, the communication order is never changed.

FIG. 13 is a diagram for explaining setting of the carrier empty time which needs to be secured on the transmission path prior to transmission of the packet. According to the second embodiment, as the communication order comes later, the carrier empty time on the transmission path which needs to be secured is increased, so that it is 50 μseconds for the first LAN unit 23, 100 μseconds for the second LAN unit 33 and 150 μseconds for the third LAN unit.

As described above, this carrier empty time refers to an empty time of the transmission path from a transmission termination point ed of a packet or disturbing signal existing on the transmission path just before transmitting the packet as shown in FIG. 13. Therefore, by changing the carrier empty time secured on the transmission path depending on the allocated communication order, this carrier empty time itself becomes information indicating priority of packet transmission upon transmission of real time data through the packet.

In a case shown in FIG. 13, at timing T1 which is 50 μseconds after the transmission termination point ed of the packet or disturbing signal existing on the transmission path just before transmitting the packet, the LAN unit 23 is enabled to transmit the packet. If at the timing T1, the packet is not transmitted from the LAN unit 23 for some reason, the LAN unit 33 is enabled to transmit the packet at timing T2 which is 100 μseconds after the transmission termination point ed of the packet or disturbing signal just before.

Likewise, if no packet is transmitted from the LAN unit 23 at timing T1 for some reason and no packet is transmitted from the LAN unit 33 at timing T2 for some reason, the LAN unit 53 is enabled to transmit the packet at timing T3, which is 150 μseconds after the transmission termination point ed of the packet or disturbing signal just before.

Therefore, if a packet for transmitting real time data is not transmitted because of a trouble of a LAN terminal device located at a higher communication order, a LAN terminal device located at a next communication order is enabled to transmit the packet, so that the packet can be transmitted effectively.

This setting of the carrier empty time is carried out by a control section 310 of the LAN unit, which receives the head timing signal through the receiving section 302 so as to detect a communication order allocated to itself, for the carrier empty time detecting section 304. Then, the carrier empty time detecting section 304 detects the carrier as described above and if it detects emptiness of the transmission path, counts transmission path emptiness duration time. If this count value coincides with a set empty time (set value), it supplies a transmission instruction to the transmitting section 303.

Therefore, if the transmission path is not available because for example, a disturbing signal is mixed into the transmission path during counting of the transmission empty time, the count value up to then is cleared. If an emptiness of the transmission path is confirmed again after the disturbing signal is eliminated, the counting is carried out from first again. That is, the carrier empty time detecting section 304 detects a continuous empty time on the transmission path.

However, if the packet is transmitted from the LAN unit 23 having the first communication order properly, if a disturbing signal or the like is mixed in at least for 100 μseconds after the transmission termination point of that packet, the LAN unit 33 cannot transmit the packet for transmitting the real time data until 100 μseconds passes after the transmission termination point of that disturbing signal. This leads to reduction of the entire communication amount.

The LAN unit of the second embodiment monitors all packets transmitted to the transmission path and if the packet is transmitted from a LAN unit located at a higher communication order properly, it reduces a carrier empty time set up in the carrier empty time detecting section 304. In this case, the empty time is reduced to an empty time corresponding to a communication order raised by one from its own communication order.

FIG. 14 is a diagram for explaining a procedure for reducing the carrier empty time set in the carrier empty time detecting section 304 corresponding to a communication order assigned to itself. As described with reference to FIG. 13, a case where corresponding to the communication order notified through the head timing signal, 50 μseconds empty time is set for the LAN unit 23, 100 μseconds empty time is set for the LAN unit 33 and 150 μseconds carrier empty time is set for the LAN unit 53 will be described.

In the carrier empty time detecting section 304 of the LAN unit 23, the empty time (carrier empty time) to be secured on the transmission path is set to 50 μseconds. If any disturbing signal is not mixed in the transmission path, as shown in FIG. 14B, the LAN unit 23 transmits the packet at timing T1 in which emptiness of 50 μseconds of the transmission path is detected after the transmission termination point of the head timing signal (FIG. 14A).

Then, the packet transmitted from the LAN unit of each LAN terminal device contains an address (transmitter ID) of the transmitter LAN unit and an address (destination ID) of object destination. Thus, in the LAN unit of each LAN terminal device connected to the LAN system according to the second embodiment, information indicating a transmitter is extracted from a packet received by the receiving section 302. What communication order the LAN unit transmitting the packet has can be known by considering this extracted information and communication order allocated to each LAN terminal device notified through the head timing signal.

If it is detected that the packet is transmitted from a LAN unit having a higher communication order than that allocated to itself, its own communication order is raised within the communication cycle, thereby reducing the carrier empty time set up in the carrier empty time detecting section 304.

That is, if the packet is transmitted from the LAN unit 23 as shown in FIG. 14B, the LAN unit 33 reduces the carrier empty time set up in the carrier empty time detecting section 304 from 100 μseconds to 50 μseconds by control by the control section 310 as shown in FIG. 14C. Likewise, the LAN unit 53 reduces the carrier empty time set in the carrier empty time detecting section 304 from 150 μseconds to 100 μseconds by a control of the control section 310 as shown in FIG. 14D.

If any disturbing signal is mixed in the transmission path for 50 μseconds after the packet is transmitted from the LAN unit 23 as shown in FIG. 14C, the LAN unit 33 transmits the packet at timing T1 in which 50 μseconds pass after the transmission of the packet from the LAN unit 23 is completed. In this case, the LAN unit 53 reduces the carrier empty time set in the carrier empty time detecting section 304 from 100 μseconds to 50 μseconds by control of the control section 310 as shown in FIG. 14E.

If any disturbing signal or the like is not mixed in the transmission path after data is transmitted from the LAN unit 33, the LAN unit 53 is enabled to transmit the packet at timing T1 in which 50 μseconds pass after the packet is transmitted from the LAN unit 33 as shown in FIG. 14(E).

Consequently, each LAN unit prevents preliminarily determined communication order from being disturbed when transmitting real time data. Thus, the real time data can be transmitted securely. Further, because its own packet can be transmitted in a time as short as 50 μseconds after a previous transmission of the packet is completed, the real time data can be transmitted quickly and effectively.

Setting of the empty time corresponding to communication order carried out in each LAN unit, reduction of the set empty time and packet transmission control processing will be described with reference to flow charts of FIGS. 15, 16.

Figure 15:
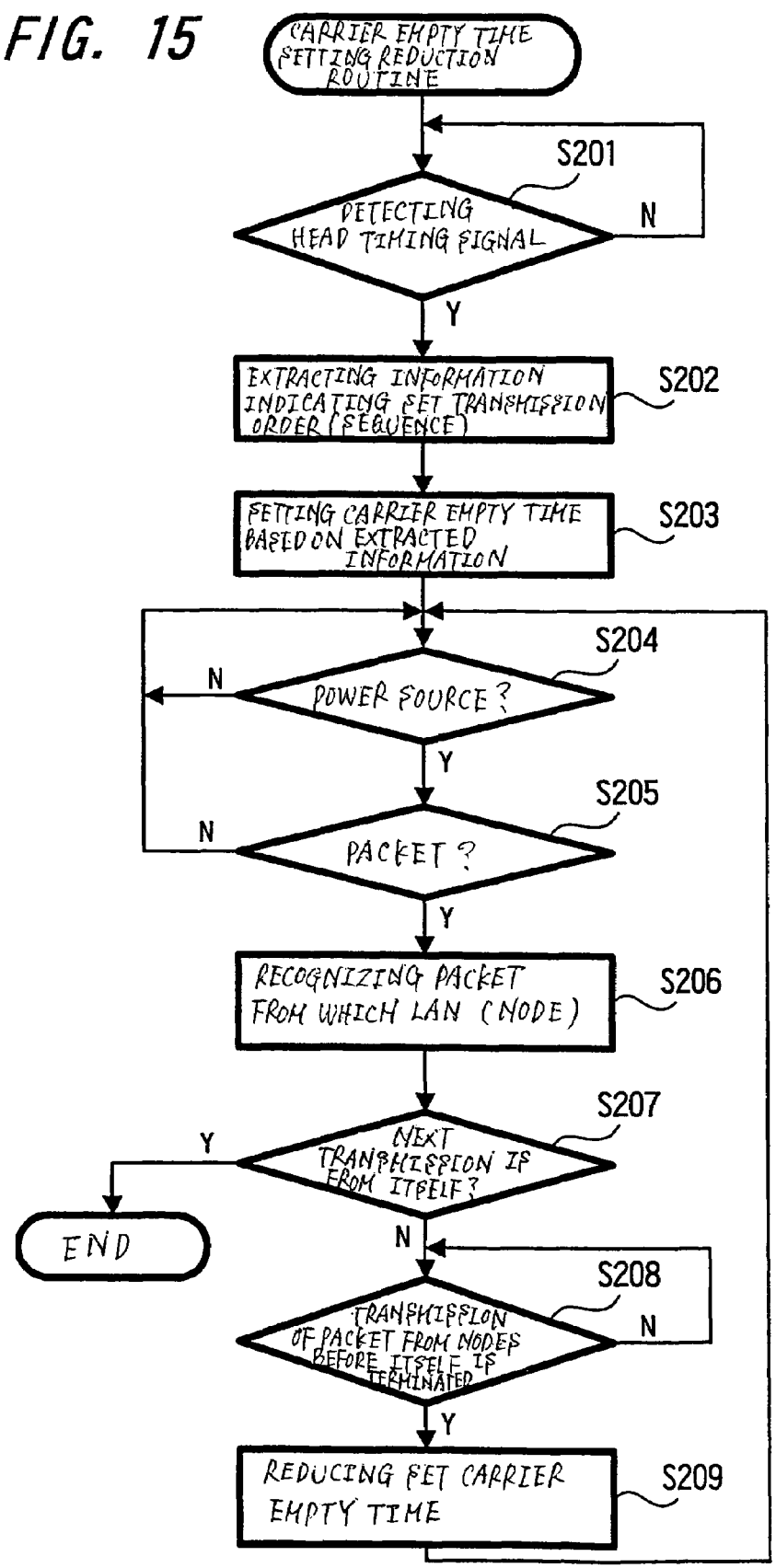
FIG. 15 is a flow chart for explaining setting of the carrier empty time and reduction processing carried out in the LAN unit.

FIG. 15 is a flow chart for explaining setting processing for the empty time and reduction processing for the set empty time corresponding to communication order allocated to itself, to be carried out by the LAN unit of a LAN terminal device which transmits a communication order allocation request.

The LAN unit which transmits a communication order allocation request to transmit real time data carries out a processing shown in FIG. 15. First, the control section 310 of the LAN unit determines whether or not a head timing signal sent from the control section is received through the receiving section 302 (step S201). If it is determined that the head timing signal is not received in the determining processing of step S201, the determining processing of this step S201 is repeated until the head timing signal is received.

If it is determined that the head timing signal is received in the determining processing of step S201, the control section 310 controls the receiving section 302 to extract information indicating communication order from the head timing signal received by the receiving section 302 (step S202).

The control section 310 sets up a carrier empty time corresponding to communication order allocated to itself extracted from the head timing signal in the carrier empty time detecting section 304 (step S203). That is, as described with reference to FIG. 13, in the processing of step S203, a carrier empty time corresponding to communication order is set in the carrier empty time detecting section 304, so that carrier empty time of 50 µseconds is set if the allocated communication order is the first and 100 µseconds is set up if the communication order is the second.

In step S202, the receiving section 302 extracts not only the allocated communication order but also communication order allocated to other LAN terminal devices which is a communication order allocation requester and information indicating the packet length of real time data to be transmitted by other LAN terminal devices and supplies them to the control section 310.

Consequently, the control section 310 can know how many LAN terminal devices sharing the same transmission path intend to transmit real time data or the packet length of real time data to be transmitted from those LAN terminal devices. As a result, the real time region RL for real time communication and random access region RM can be distinguished clearly in a communication cycle.

According to the second embodiment, if the carrier empty time is set up in the carrier empty time detecting section 304 by processing of step S203, as described in detail later, the carrier empty time detecting section 304 detects emptiness of the transmission path and counts that empty time. Based on the counted value and set carrier empty time, the packet transmission control processing is started separately from the processing shown in FIG. 15.

If the carrier empty time is set up in the carrier empty time detecting section 304 by processing of step S203 in the processing shown in FIG. 15, according to the second embodiment, the control section 310 determines whether or not any electric wave including the packet or disturbing signal such as noise is transmitted to the transmission path based on a result of the carrier detection by the carrier empty time detecting section 304 (step S204).

If it is determined that any electric wave is not transmitted to the transmission path by the determining processing of step S204, the reduction processing for the carrier empty time, which will be described later, is not necessary. Thus, the processing from the step S204 is repeated. Further, if it is determined that any electric wave is transmitted to the transmission path by the determining processing of step S204, the control section 310 determines whether or not the electric wave transmitted to the transmission path is a packet from the other LAN terminal devices sharing the same transmission path based on a result of reception by the receiving section 302 (step S205).

If it is determined that the electric wave transmitted to the transmission path is so-called disturbing signal such as noise or a signal generated from other electronic devices by the determining processing of step S205, the reduction processing for the carrier empty time, which will be described later, is not necessary. Thus, the processing from step S204 is repeated.

If it is determined that the electric wave transmitted to the transmission path is a packet sent from the other LAN terminal devices sharing the same transmission path by the determining processing of step S205, from which LAN unit that packet is sent is determined based on information contained by the packet received by the receiving section 302 (step S206).

In step S206, whether or not a communication order for transmitting the packet next is itself (from its own node) is determined, based on recognized information and communication order allocated to all LAN terminal devices which are communication order allocation requester provided by the head timing signal (step S207).

If it is determined that the communication order for transmitting the packet next is not from its own node by the determining processing of step S207, whether or not the transmission of a packet from a LAN unit whose communication order transmitted to the transmission path is before its own node is completed is determined (step S208). This determination can be carried out based on information obtained by receiving a packet transmitted to the transmission path by the receiving section 302 and then investigating its content.

If it is determined that the transmission of the packet from a LAN unit before its own node is not completed by the determining processing of step S208, the processing of step S208 is repeated and a waiting condition is arisen until the transmission of that packet to the transmission path is completed.

If it is determined that the transmission of the packet from the LAN unit before its own node in terms of communication order is completed by the determining processing of step S208, the control section 310 changes the carrier empty time set up in the carrier empty time detecting section 304 to a carrier empty time in which the communication order allocated to itself is raised by one (step S209).

In a processing of step S209, after transmission of the packet from a LAN unit of a preceding communication order is terminated, carrier empty time is reduced to raise the priority of packet transmission within the communication cycle. If the processing for reduction of the carrier empty time is terminated, the control section 310 repeats the processing of step S204.

In the determining processing of step S207, when it is determined that an order for transmitting the packet next is its own node, it (its own node) has the highest priority timing for transmission of the packet. If the processing shown in FIG. 15 is terminated while the transmission of the real time data is not terminated, the processing shown in FIG. 15 is repeated and in a next communication cycle, the same processing is carried out.

According to the second embodiment, a communication order is allocated, and setting of the carrier empty time and reduction processing are carried out depending on the allocated communication order.

Figure 16:
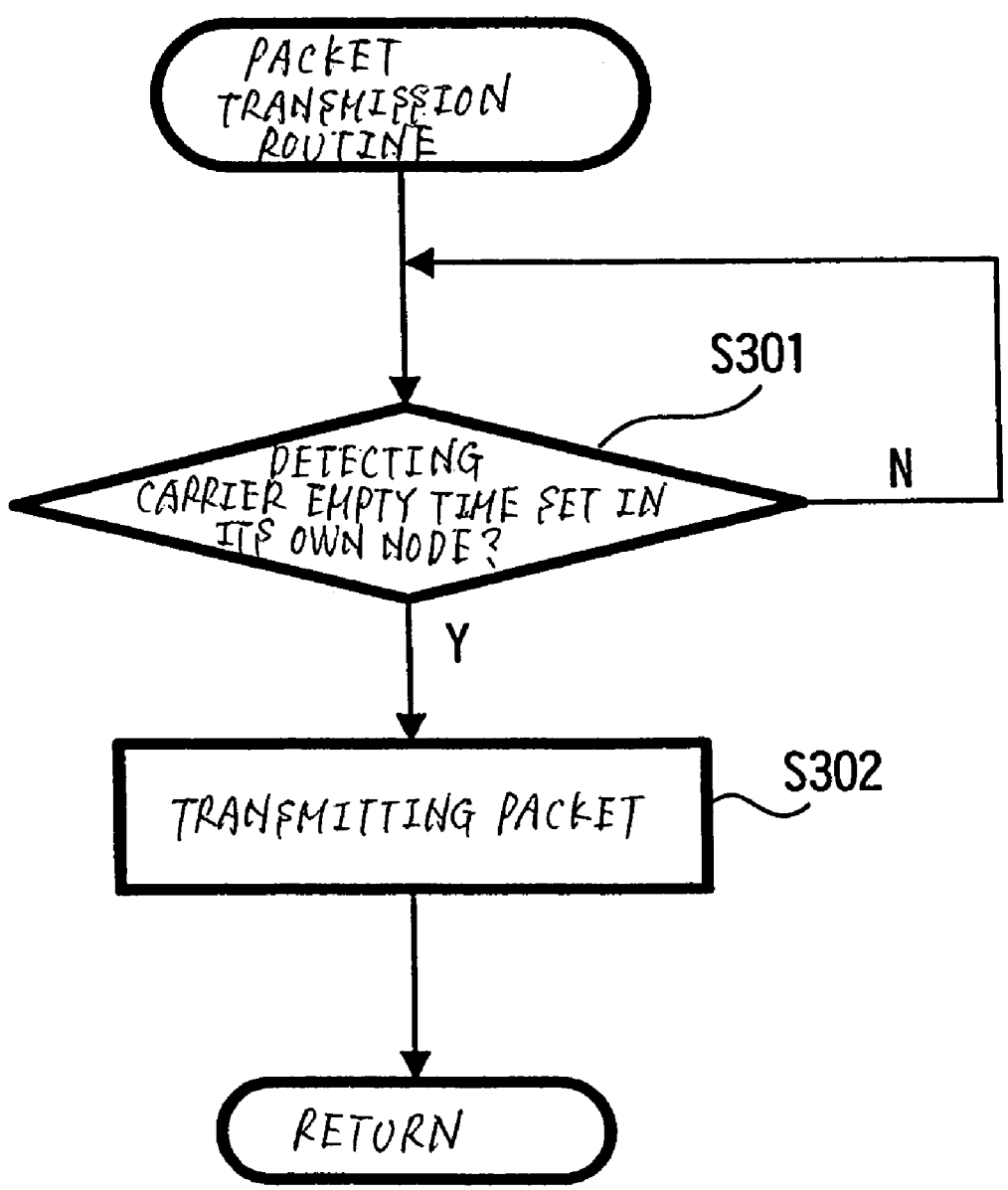
FIG. 16 is a flow chart for explaining packet transmission control processing considering the carrier empty time.

FIG. 16 shows a flow chart for explaining a packet transmission control processing to be carried out in the carrier empty time detecting section 304 in which a carrier empty time is set up in step S203 of FIG. 15.

If as described above, the carrier empty time is set up corresponding to the communication order allocated to itself by the control section 310, when the carrier empty time detecting section 304 detects that the transmission path is empty by detecting the carrier, it starts counting the transmission path empty time. By comparing this counted value with the set carrier empty time, whether or not emptiness of the transmission path corresponding to the set carrier empty time is detected is determined (step S301).

According to the second embodiment, if a disturbing signal is mixed after the counting of the transmission path empty time is started, the counted value is cleared. If the transmission path emptiness is detected again, counting of the transmission path is carried out from the beginning.

Until the emptiness of the transmission path corresponding to the set up carrier empty time is detected, the processing of step S301 is repeated. If in the determining processing of step S301, it is determined that the carrier empty time detecting section 304 detects emptiness of the transmission path corresponding to the set carrier empty time, the carrier empty time detecting section 304 supplies a control signal for instructing transmission of a real time data packet to the transmitting section 303. Then, transmission of the real time packet from the transmitting section 303 is carried out (step S302).

Like the above described first embodiment, the LAN terminal device intending to transmit the real time data transmits a packet communication order allocation request to the control station. After the LAN unit intending to transmit the real time data receives the packet communication order allocation, packet transmission condition from an LAN unit having a communication order higher than itself is monitored through the receiving section 302 so as to reduce the carrier empty time.

Consequently, the packet for transmitting real time data sent out successively from each LAN unit can be transmitted in a minimum interval relative to an electric wave just before (50 µseconds according to the second embodiment). If no packet is transmitted from a LAN unit of a preceding communication order for some reason, the packet can be transmitted from a LAN unit of the next communication order.

Further, even if a proper transmission timing corresponding to a communication order allocated to the LAN unit of each LAN terminal device is shifted due to a mixture of a disturbing signal or the like into the transmission path, a collision and exchange of communication order are prevented by the priority order (priority timing for packet transmission) by the carrier empty time which is an interval relative to an electric wave just before, so that the packet can be transmitted corresponding to a communication order determined preliminarily by the control station.

As evident from the above description, according to the second embodiment, the control section 310 of the LAN unit has a function as a empty time setting means for setting the carrier empty time in the carrier time detecting section 304. The carrier empty time detecting section 304 has a function as a data transmission control means for controlling the transmission timing of the real time data from the transmitting section 303.

The receiving section 302 and control section 310 achieve a function as a data transmission detecting means for detecting whether or not a packet is transmitted from a LAN unit having a higher communication order than itself. The control section 310 has a function for reducing a carrier empty time set up in the carrier empty time detecting section 304.

FIG. 17 is a diagram for explaining a case where in the LAN system of the second embodiment shown in FIG. 11, the real time data is transmitted from the LAN terminal device 2 to the LAN terminal device 4, from the LAN terminal device 3 to the LAN terminal device 2 and from the LAN terminal device 5 to the LAN terminal device 3.

Each LAN terminal device composing the LAN system of the second embodiment knows a communication order allocated to each LAN terminal device which transmitted a communication order allocation request according to the head timing signal (FIG. 17A) form the LAN terminal device 1 operating as the control station.

According to the second embodiment, as described above, the first, second and third communication orders are allocated to the LAN terminal device 2, LAN terminal device 3 and LAN terminal device 5. As described above, in the LAN unit of each LAN terminal device to which the communication order is allocated, the carrier empty time is set up.

According to the second embodiment, if any disturbing signal is not mixed in the transmission path, the LAN unit 23 which has the first communication order and in which a carrier empty time of 50 µseconds is set up transmits a packet for transmitting the real time data after 50 µseconds pass after the transmission of the head timing signal (FIG. 17A) is terminated as shown in FIG. 17B.

If the packet is transmitted from the LAN unit 23, as described above, the carrier empty time set up in the carrier empty time detecting section 304 of the LAN unit 33 is reduced from 100 µseconds to 50 µseconds and the carrier empty time set up in the carrier empty time detecting section 304 of the LAN unit 53 is reduced from 150 µseconds to 100 µseconds.

If as shown in FIGS. 17B, 17C, an external noise is mixed in the transmission path just after the packet is transmitted from the LAN unit 23, transmission of the packet from the LAN unit 33 and LAN unit 53 having a communication order lower than the second communication order is disabled.

However, because each LAN unit can know that the external noise is eliminated by detecting the carrier as described above, the LAN unit 33 transmits the packet after 50 µseconds pass after the external noise is eliminated as shown FIG. 17C.

In this case, the transmission timing of the packet from the LAN unit 33 is originally the same as or near the transmission timing of the packet from the LAN unit 53. However, because the carrier empty time set up in the LAN unit 53 is 100 µseconds, the LAN unit 53 never transmits the packet ahead of the LAN unit 33 or at the same time as the LAN unit 33.

If the packet is transmitted from the LAN unit 33, the carrier empty time set up in the carrier empty time detecting section 304 of the LAN unit 53 is reduced to the shortest time of 50 µseconds from 100 µseconds according to the second embodiment. Consequently, as shown in FIG. 17D, the LAN unit 53 transmits the packet from the LAN unit 33 50 µseconds after the transmission of the packet is terminated.

When the next communication cycle is reached, the setting of the carrier empty time and reduction processing are carried out as shown in FIG. 15. If any disturbing signal such as an external noise is not mixed in the transmission path, as shown in FIG. 17, the transmission of the packet can be carried out 50 µseconds which is the shortest time after the transmission of a packet just before is terminated.

As described above, the LAN unit of the LAN terminal device intending to transmit the real time data maintains the communication order corresponding to the packet communication order for transmitting the real time data preliminarily set by using the carrier detecting time which is the priority order of the packet transmission corresponding to the allocated communication order even if the disturbing signal is generated, so that the packet can be transmitted according to an appropriate order.

Because the carrier empty time set up in the carrier empty time detecting section 304 of the LAN unit is changed corresponding to reception of a packet having a higher communication order, if other communication device or noise source exist on the transmission path, the packet can be transmitted at appropriate timing by avoiding such disturbing signals. Further, if a random access signal is mixed in the transmission path, transmission of following real time data can be continued properly.

Because the real time data is transmitted through the real time region for transmitting the real time data by using the communication method, communication system and communication terminal of the second embodiment, the real time data can be transmitted securely. Further, because the random data can be transmitted or received by using another region than the real time region as the random access region, transmission capacity can be increased.

Because the emptiness of the transmission path is recognized in the real time region to which the communication order is allocated, not only this system can coexist with a device which carries out only the random access but also it prevents a disturbance by noise, so that the real time data can be transmitted securely and accurately.

In this second embodiment, a case where the carrier empty time is set to 50 μseconds, 100 μseconds and 150 μseconds if the communication order is the first, second and third respectively has been described. However, the setting of the carrier empty time is not restricted to this example.

For example, if the communication order is the first, second and third, the carrier empty time may be set to 20 μseconds, 50 μseconds and 70 μseconds respectively or shorter or longer than these values. Further, the length of the carrier empty time may be changed depending on the quantity of the LAN terminal devices connected to the LAN system or the quantity of the LAN terminal devices to which the communication order is allocated.

Although the second embodiment has been described with a case where the LAN terminal device 1 serves as the control station (communication control device) so that the communication order is allocated depending on a communication order allocation request from each LAN terminal device, the present invention is not restricted to this example. For example, like the first embodiment described previously, the LAN terminal device itself intending to transmit the real time data may allocate the communication order depending on a communication order allocation condition at that point and declare it to other LAN terminal devices.

The second embodiment has been described with a case of single direction communication for transmitting the real time data from the LAN terminal device 2 like the first embodiment described with reference to FIG. 3. However, this invention is also applied to a case of bi-directional communication.

In case of the bi-directional communication, a communication request is transmitted from a terminal of communication requester to a destination terminal. Corresponding to this communication request, a communication response from a mating terminal which recognizes that bi-directional communication will be carried out is transmitted from a terminal of communication supplier to a terminal of communication requester and the mating terminal. Then, a communication order allocation request for requesting allocation of the real time data communication order is transmitted to the control station.

By executing the process shown in flow charts shown in FIGS. 15, 16 in the communication request terminal and mating terminal corresponding to the communication order allocated to the communication order allocation request, transmission and reception of the real time data are enabled in case of the bi-directional communication as well as single direction communication.

Of course, in case of the bi-directional communication also, if a terminal of communication requester receives a communication response from a mating terminal without provision of the control station, it is permissible to allocate the communication order to both itself and the mating terminal and declare it to each LAN terminal device. Conversely, it is also permissible to provide a dedicated server which acts as only a communication control unit in the network and control communication of plural communication control terminals by this dedicated communication control unit.

If according to the second embodiment also, some real time data (packet) cannot be transmitted in the real time region corresponding to the communication order, it may be transmitted again through the random access region like the first embodiment.

For example, voice data and animation data have different packet lengths although they are both real time data. By transmitting these data to the control station by adding information indicating the length of a packet to be transmitted to the communication order allocation request so as to transmit them including the head timing signal to all the LAN terminal devices, the real time region RL and the random access region RM can be distinguished accurately in all the LAN terminal devices so that both the regions can be used separately depending on the purpose.

According to the second embodiment, the transmission timing of the real time data is not allocated fixedly but the transmission order is allocated. Even if the length of the packet (packet length) for transmitting real time data is changed depending on real time data, it is possible to correspond to this flexibly and transmit the real time data effectively and accurately.

In the second embodiment also, a ratio between the real time region and the random access region in a communication cycle may be set up preliminarily. For example, it is permissible to set up so that ⅔ of a communication cycle is set to real time region and ⅓ of a communication cycle is set to random access region. It is also permissible to set up the real time region and random access region alternately in a communication cycle.

Meanwhile in the first and second embodiments, as described above, in the LAN terminal device 1 which acts as the control station, the control section 210 of the LAN unit 12 or the control section 310 of the LAN unit 13 has a function as a means for controlling the communication cycle and a function as a communication timing allocating means for allocating communication timing or communication order or a communication order allocating means.

According to the first embodiment, as described above, the control section 210 and the transmitting/receiving section 202 cooperate with each other to achieve a function as a communication timing notice means. Further according to the second embodiment, the control section 310 and the transmitting/receiving section 303 cooperate with each other so as to achieve a function as communication order notice means.

A LAN system according to the first and second embodiments is an example and the present invention can be applied to various LAN systems.

Although according to the aforementioned first and second embodiments, each LAN terminal device is connected to the network by radio, the present invention is not restricted to this example, and can be applied to a case in which they are connected to the network by wire.

Although in the above described respective embodiments, the LAN unit which is a communication terminal of the present invention is a separate unit form the terminal device, the present invention is not restricted to this. For example, it is permissible to load the LAN unit on the terminal device.

That is, it is permissible to load the terminal device with a communication function and the control section of the terminal device with the same function as the control section of the LAN unit. In this case, the function of the control section of the LAN unit can be achieved by software which is operated in the control section of the terminal device.

As described above, according to the present invention, the real time data can be transmitted through the real time region at real time and the random data can be transmitted through the random access region by random access. Consequently, the real time data can be transmitted or received securely. Further, both the real time data and random data can be transmitted so that the transmission capacity can be increased thereby improving throughput.

Further, because emptiness of the transmission path is detected in the real time region for transmitting data based on communication timing, this system can coexist with a device for carrying out only random access. Further, it is possible to prevent protection from damage by a disturbing signal such as noise.

Further, by using the allocation of the communication order (communication sequence) and carrier empty time, the real time data can be transmitted securely and accurately without setting up the transmission timing of the real time data fixedly while preventing a collision of use of the transmission path securely.

Further, by using the allocation of the communication order (communication sequence) and carrier empty time, the packet can be transmitted from each LAN terminal device so that the carrier empty time is the shortest. Thus, the transmission path can be used without waste and the transmission capacity of the system can be increased.

Further, by using the allocation of the communication order (communication sequence) and the carrier empty time, even if no packet is transmitted from a LAN terminal device having a higher communication order, a LAN terminal unit of a next communication order can transmit the packet at timing corresponding to its own carrier empty time, without wasting a time used for transmission of a packet from the LAN terminal device having a higher communication order. Thus, the transmission path can be used without waste and the transmission capacity of the system can be increased.

When transmitting a compressed signal by rate variable compression method, it is possible to cope with changes of the packet length due to deviation of the rate only by setting a channel corresponding to, for example, average transmission rate.

INDUSTRIAL APPLICABILITY

The LAN systems of the first and second embodiments are only examples and the present invention may be applied to various LAN systems. Although the LAN systems of the first and second embodiments are connected to network by radio, the present invention is not restricted to this, but may be applied to LAN system connected by wire. Further, although the above embodiments have been described on an assumption that the LAN unit which is a communication terminal of the present invention is a separate unit from the terminal device, the present invention is not restricted to this example. That is, it is permissible to load the terminal device with a communication function and provide a control section of the terminal device with the same function as the control section of the LAN unit. In this case, the function of the control section of the LAN unit can be achieved by software operated by the control section of the terminal device.

The invention claimed is:

1. A communication method for a plurality of communication terminals sharing a single channel to permit a communication terminal to communicate at a predetermined communication cycle while avoiding a collision with an other communication terminal, comprising:
   a communication timing registering step for allocating communication timing of a communication terminal intending to start a communication within said communication cycle; upon start-up of the communication; and
   a notifying step for notifying other communication terminals sharing said channel of the allocated communication timing;
   whereby said notifying is performed for each iteration of said communication cycle;
   wherein a real time region for communicating real time data based on the allocated communication timing and a random access region for communicating data at random timing are provided by dividing said communication cycle into two sections;
   wherein if the real time data transmitted through said real time region is not received properly, said real time data not received properly is re-transmitted through said random access region.

2. A communication method for a plurality of communication terminals sharing a single channel to communicate bi-directionally between a call terminal that is a communication terminal for calling and a mating terminal that is a communication terminal called by said call terminal at a predetermined communication cycle while avoiding a collision of use with other communication terminals, comprising:
   a calling step for said call terminal to call said mating terminal by random access;
   a responding step for said mating terminal to respond to said call terminal when accepting a call from said call terminal;
   a communication timing allocation step for allocating communication timing for said call terminal and said mating terminal in said communication cycle, when said response arises corresponding to said call; and
   a notifying step for notifying the allocated communication timing to other communication terminals sharing said channel,
   said call terminal and said mating terminal executing bi-directional communication by executing transmission based on the corresponding communication timing at every communication cycle.

3. The communication method according to claim 2, wherein
   at least one communication control unit for controlling said communication cycle is provided in a network comprised of the plurality of communication terminals sharing said channel, further comprising a timing allocation request step for said call terminal, if a response to said call arises from said mating terminal, to form an allocation request for requesting to allocate said communication timing to both itself and said mating terminal and to transmit to said communication control unit, said communication control unit executing said communication timing allocation step and said notifying step corresponding to said allocation request.

4. The communication method according to claim 2, wherein when a response to said call terminal is returned from said mating terminal, said call terminal itself carries out said communication timing allocation step and said notifying step.

5. The communication method according to claim 2, wherein a real time region for transmitting real time data based on the allocated communication timing and a random access region for transmitting data at random timing are provided by dividing said communication cycle into two sections.

6. The communication method according to claim 5, wherein said real time region is set up successively in said communication cycle corresponding to said communication timing allocated while a remaining region of said communication cycle is used as said random access region.

7. The communication method according to claim 5, wherein if the real time data transmitted through said real time region is not received properly, said real time data not received properly is re-transmitted through said random access region.

8. The communication method according to claim 2, wherein said channel uses a carrier of a same predetermined frequency and avoiding a collision is carried out by detecting presence or absence of said carrier on said channel.

9. A communication method for a plurality of communication terminals sharing a single channel to communicate at a predetermined communication cycle while avoiding a collision with other communication terminals, comprising:

a communication order allocating step for allocating communication order to a communication terminal intending to start a communication, upon start-up of the communication;

a notifying step for notifying the allocated communication order to other communication terminals sharing said channel;

an empty time setting step for setting a length of empty time in said channel capable of starting transmission of data corresponding to the allocated communication order in said communication terminal to which said communication order is allocated; and a data transmitting step for transmitting data, when emptiness of the same length as said empty time set up in said empty time setting step is detected on said channel in said communication terminal to which said communication order is allocated.

10. The communication method according to claim 9 further comprising:

a data transmission detecting step for detecting whether or not a communication terminal having a higher communication order than itself transmits data in each of said communication terminals to which said communication order is allocated; and an empty time reduction step for reducing said empty time set in said empty time setting step corresponding to the allocated communication order when it is detected that a communication terminal having a higher communication order than itself transmits data in said data transmission detecting step.

11. The communication method according to claim 9, wherein at least one communication control unit for controlling said communication order is provided in a network comprised of plural connected communication terminals sharing said channel, said communication control unit, when said communication terminal intending to start communication transmits an allocation request for said communication order to said communication control unit, executing said communication order allocation step and executing said notifying step.

12. The communication method according to claim 9, wherein said communication terminal intending to start communication allocates its own communication order by itself to execute said communication order allocating step and execute said notifying step.

13. The communication method according to claim 9, wherein a real time region for communicating real time data based on the allocated communication order and a random access region for transmitting data at random timing are provided by dividing said communication cycle into two sections.

14. The communication method according to claim 13, wherein said real time region is set up successively in said communication cycle corresponding to said communication order allocated while a remaining region of said communication cycle is used as said random access region.

15. The communication method according to claim 13, wherein if the real time data transmitted through said real time region is not received properly, said real time data not received properly is transmitted bi-directionally between the call terminal and a mating terminal which is said communication terminal, comprising:

a calling step for said call terminal to call said mating terminal of an object by random access;

a responding step for said mating terminal to respond to said call terminal when accepting a call from said call terminal; and a communication order allocation step for, if said response arise corresponding to said call, allocating communication orders for said call terminal and said mating terminal, each of the allocated communication orders being re-transmitted through other communication random access regions sharing said channel.

16. The communication method according to claim 9, wherein said channel uses a carrier having a same predetermined frequency and detection of the empty time in said channel is carried out by detecting absence of said carrier.

17. A communication method comprising:

a notifying step for a plurality of communication terminals sharing a single channel to notify a call terminal which is said communication terminal for calling and a mating terminal that is a communication terminal called by said call terminal at a predetermined communication cycle while avoiding a collision with an other communication terminal;

an empty time setting step for setting length of empty time in said channel capable of starting transmission of data corresponding to the allocated communication order in said communication terminal to which said communication order is allocated; and a data transmitting step for transmitting data, when emptiness of the same length as said empty time set up in said empty time setting step is detected on said channel in said communication terminal to which said communication order is allocated, said call terminal and said mating terminal executing bi-directional communication by executing transmission at each corresponding communication order at every communication cycle.

18. The communication method according to claim 17 further comprising:

a data transmission detecting step for detecting whether or not a communication terminal having a higher communication order than itself transmits data in each of said communication terminals to which said communication order is allocated; and an empty time reduction step for reducing said empty time set in said empty time setting step corresponding to the allocated communication order when it is detected that a communication terminal having a higher communication order than itself transmits data in said data transmission detecting step.

19. The communication method according to claim 17, wherein at least one communication control unit for controlling said communication cycle is provided in a network comprised of plural connected communication terminals sharing said channel, said call terminal forms, if a response to said call arises from said mating terminal, an allocation request for requesting to allocate said communication order to both itself and said mating terminal, executing a timing allocation request step for transmitting to said communication control unit, and said communication control unit executes said communication order allocation step and said notifying step corresponding to said allocation request.

20. The communication method according to claim 17, wherein when a response to said call terminal is returned from said mating terminal, said call terminal itself carries out said communication timing allocation step and said notifying step.

21. The communication method according to claim 17, wherein a real time region for transmitting real time data based on the allocated communication order and a random access region for transmitting data at random timing are provided by dividing said communication cycle into two sections.

22. The communication method according to claim 21, wherein said real time region is set up successively in said communication cycle corresponding to said communication order allocated while a remaining region of said communication cycle is used as said random access region.

23. The communication method according to claim 21, wherein if the real time data transmitted through said real time region is not received properly, said real time data not received properly is re-transmitted through said random access region.

24. The communication method according to claim 17, wherein said channel uses a carrier of a same predetermined frequency and detection of emptiness in said channel is carried out by detecting absence of said carrier on said channel.

25. A communication system comprising:

at least one communication control unit and plurality of other communication terminals sharing a single channel and said plurality of other communication terminals communicate at a predetermined communication cycle while avoiding a collision with other communication terminals, each of said plurality of communication terminals including:

allocation request means for, upon start-up of communication, generating a communication timing allocation request and transmitting this to said communication control unit;

transmission control means for transmitting data at communication timing allocated by said communication control unit at every communication cycle;

a random access control means for, if data to be transmitted is real time data, transmitting said real time data by said transmission control means based on said communication timing set up by said communication control unit corresponding to said allocation request, and if data to be transmitted is random data generated at random, transmitting through random access region other than the real time region for transmitting said real time data in said communication cycle; and a re-transmission control means for, if said real time data transmitted through said real time region by control of said transmission control means is not received properly, re-transmitting said real time data not transmitted properly through said random access region;

said communication control unit including:

means for controlling said communication cycle;

communication timing allocation means for allocating said communication timing to said communication terminal of a requester corresponding to said allocation request from each of said plural communication terminals; and communication timing notifying means for transmitting said communication timing allocated by said communication timing allocation means to each of said plural communication terminals;

whereby said notifying is performed for each iteration of said communication cycle.

26. The communication system according to claim 25, wherein said real time region for transmitting said real time data is set up successively in said communication cycle each time when said communication timing is set up by said communication control unit, said random access control means using a remaining portion of said communication cycle in which said real time region is set up as said random access region.

27. The communication system according to claim 25, wherein said shared channel uses a carrier having a same predetermined frequency, each of said plural communication terminals having a carrier detecting means for detecting presence or absence of said carrier on said channel and avoiding a collision of use of said shared channel corresponding to this detection result.

28. A communication system comprising:

at least a communication control unit and a plurality of other communication terminals sharing a channel and each of said plurality of communication terminals carries out bi-directional communication at every predetermined communication cycle while avoiding a collision of use of said channel with other communication terminals, each of said plural communication terminals having communication request means for forming a communication request for calling a mating terminal of an object and transmitting this to said mating terminal by random access;

allocation request means for, if a response is returned from said mating terminal corresponding to said communication request formed by said communication request means, forming an allocation request of communication timing for itself which is a call terminal and said mating terminal and transmitting this to said communication control unit;

responding means for, when responding to a communication request transmitted to itself, forming a response to be returned to the call terminal and transmitting this to said call terminal; and transmission control means for transmitting data corresponding to communication timing for self from said communication control unit, said communication control unit having:

means for controlling a communication cycle;

communication timing allocation means for allocating said communication timing to said call terminal and said mating terminal corresponding to said allocation request of the communication timing to said call terminal and said mating terminal from said call terminal; and communication timing notifying means for notifying each of said plural communication terminals of said communication timing allocated by said communication timing allocation means.

29. The communication system according to claim 28, wherein each of said plural communication terminals has random access control means for, when it is intended to transmit real time data, transmitting data based on said communication timing by a control of said transmission control means, and when it is intended to transmit random data generated at random by random access, transmitting the random data through a random access region other than the real time region for transmitting said real time data within said communication cycle.

30. The communication system according to claim 29, wherein said real time region for transmitting said real time data is set up successively each time when said communication timing is set up by said communication control unit, and said random access control means of said communication terminal uses a remaining portion of said communication cycle in which said real time region is set up as said random access region.

31. The communication system according to claim 29, wherein each of said plural communication terminals comprises a re-transmission control means for, if said real time data transmitted through said real time region by a control of said transmission control means is not received properly, re-transmitting said real time data not transmitted properly to said mating terminal through said random access region.

32. The communication system according to claim 28, wherein said channel uses a carrier having a same predetermined frequency, and each of said plural communication terminals has a carrier detecting means for detecting presence or absence of said carrier on said channel and avoiding a collision of use of said shared channels corresponding to this detection result.

33. A communication system comprising:

at least a communication control unit and a plurality of communication terminals sharing a channel and each of said plural communication terminals carries out communication at every predetermined communication cycle while avoiding a collision of use of said channel with other communication terminals, each of said plural communication terminals having:

allocation request means for, upon start-up of communication, generating a communication order allocation request and transmitting this to said communication control unit;

empty time setting means of setting the length of an empty time of said channel capable of starting transmission of data corresponding to said communication order allocated by said communication control unit; and data transmitting control means for, if emptiness of the same length as that of said empty time set up by said empty time setting means is detected on said channel, transmitting data from itself, said communication control unit including:

means for controlling said communication cycle;

communication order allocation means for allocating said communication order to said communication terminal of a requester corresponding to said allocation request from each of said plural communication terminals; and communication order notifying means for transmitting said communication order allocated by said communication order allocation means to each of said plural communication terminals.

34. The communication system according to claim 33, wherein each of said plurality of communication terminals has data transmission detecting means for detecting whether a communication terminal having a higher communication order than itself transmits data, and when said data transmission detecting means detects that a communication terminal having a higher communication order than itself transmits data, said empty time setting means resets said empty time set in itself shorter corresponding to said communication order allocated.

35. The communication system according to claim 33, wherein each of said plural communication terminals has a random access control means for, if data to be transmitted is real time data, transmitting said real time data by said data transmission control means based on said set up empty time, and if data to be transmitted is random data generated at random, transmitting through random access region other than the real time region for transmitting said real time data within said communication cycle.

36. The communication system according to claim 35, wherein said real time region for transmitting said real time data is set up successively each time when said communication order is set up by said communication control unit in said communication cycle, and said random access control means uses a remaining portion of said communication cycle in which said real time region is set up as said random access region.

37. The communication system according to claim 35 further comprising a re-transmission control means for, if said real time data transmitted through said real time region by control of said data transmission control means is not received properly, re-transmitting said real time data not received properly through said random access region.

38. A communication system comprising:

at least a communication control unit and a plurality of communication terminals sharing a channel and each of said plurality of communication terminals carries out bi-directional communication at every predetermined communication cycle while avoiding a collision of use of said channel with other communication terminals, each of said plural communication terminals having communication request means for forming a communication request for calling a mating terminal of an object and transmitting this to said mating terminal by random access;

allocation request means for, if a response is returned from said mating terminal corresponding to said communication request formed by said communication request means, forming an allocation request of communication order for itself which is a call terminal and said mating terminal and transmitting this to said communication control unit;

responding means for, when responding to a communication request transmitted to itself, forming a response to be returned to the call terminal and transmitting this to said call terminal;

empty time setting means of setting the length of an empty time of said channel capable of starting transmission of data corresponding to said communication order allocated by said communication control unit; and data transmitting control means for transmitting data, when an emptiness of the same length as that of said empty time set up by said empty time setting means is detected on said channel, said communication control unit having:

means for controlling a communication cycle;

communication order allocation means for allocating said communication order to said call terminal and said mating terminal corresponding to said allocation request of the communication order to said call terminal and said mating terminal from said call terminal; and communication order notifying means for notifying each of said plural communication terminals of said communication order allocated by said communication order allocation means.

39. The communication system according to claim 38, wherein each of said plural communication terminals has a data transmission detecting means for detecting whether or not a communication terminal having a higher communication order than itself transmits data, and if said data transmission detecting means detects that the communication terminal having a higher communication order than itself transmits data, said empty time setting means resets said empty time set in itself shorter corresponding to said communication order allocated.

40. The communication system according to claim 39, wherein each of said plural communication terminals has a random access control means for if it is intended to transmit real time data, transmitting said data at timing corresponding to said empty time by control of said transmission control means, and if it is intended to transmit random data generated at random by random access, transmitting the random data through random access region other than the real time region for transmitting said real time data in said communication cycle.

41. The communication system according to claim 40, wherein said real time region for transmitting said real time data is set up successively each time when said communication timing is set up by said communication control unit in said communication cycle, and said random access control means of said communication terminal uses a remaining portion of said communication cycle in which said real time region is set up as said random access region.

42. The communication system according to claim 40, wherein each of said plural communication terminals comprises a re-transmission control means for, if said real time data transmitted through said real time region by control of said data transmission control means is not received properly, re-transmitting said real time data not received properly to said mating terminal through said random access region.

43. The communication system according to claim 39, wherein said channel uses a carrier having a same predetermined frequency, and each of said plural communication terminals has a carrier detecting means for detecting presence or absence of said carrier on said channel and avoiding a collision of use of said channel corresponding to this detection result.

44. A communication terminal of communication system, wherein at least a communication control unit and a plurality of communication terminals share a channel and each of said plurality of communication terminals carries out communication at every predetermined communication cycle while avoiding a collision with other communication terminals, comprising:

allocation request means for, prior to start-up of data communication, generating a communication timing allocation request and transmitting this to said communication control unit;

transmission control means for transmitting data at said communication timing allocated by said communication control unit at every said communication cycle;

a random access control means for, if data to be transmitted is real time data, transmitting said real time data by control of said transmission control means based on said communication timing, and if data to be transmitted is random data generated at random, transmitting through random access region other than the real time region for transmitting said real time data in said communication cycle; and a re-transmission control means for, if said real time data transmitted through said real time region by control of said transmission control means is not received properly, re-transmitting said real time data not received properly through said random access region, whereby said terminal is to receive, for each iteration of said communication cycle, communication timing allocation information for one or more other communication terminals sharing said channel.

45. The communication terminal according to claim 44, wherein said real time region for transmitting said real time data is set up successively in said communication cycle each time when said communication timing is set up, and said random access control means uses a remaining portion of said communication cycle in which said real time region is set up as said random access region.

46. The communication terminal according to claim 44, wherein said channel uses a carrier having a same predetermined frequency, said communication terminal further comprising a carrier detecting means for detecting presence or absence of said carrier on said channel and avoiding a collision of use of said shared channel corresponding to this detection result.

47. The communication terminal according to claim 44 further comprising a random access control means for, if data to be transmitted is real time data, transmitting said real time data by control of said transmission control means based on said communication timing, and if data to be transmitted is random data generated at random, transmitting through random access region other than the real time region for transmitting said real time data in said communication cycle.

48. The communication terminal according to claim 47, wherein
said real time region for transmitting said real time data is set up successively each time when said communication timing is set up in said communication cycle, and
said random access control means uses a remaining portion of said communication cycle in which said real time region is set up as said random access region.

49. The communication terminal according to claim 47 further comprising a re-transmission control means for, if said real time data transmitted through said real time region by control of said transmission control means is not received properly, re-transmitting said real time data not received properly through said random access region.

50. The communication terminal according to claim 44, wherein said channel uses a carrier having a same predetermined frequency, further comprising a carrier detecting means for detecting presence or absence of said carrier on said channel to avoid a collision of use of said shared channel based on the result of the detection.

51. A communication terminal of a communication system, wherein
at least a communication control unit and a plurality of communication terminals share a channel and each of said plurality of communication terminals carries out bi-directional communication at every predetermined communication cycle while avoiding a collision with other communication terminals, comprising:
communication request means for forming a communication request for calling a mating terminal of an object and transmitting this to said mating terminal by random access;
allocation request means for, if a response from said mating terminal is returned corresponding to said communication request formed by said communication request means, forming a communication timing allocation request to itself which is a call terminal and said mating terminal and transmitting this to said communication control unit;
responding means for, when responding to a communication request transmitted to itself, forming a response to be returned to said call terminal and transmitting this to said call terminal; and
transmission control means for transmitting data corresponding to communication timing sent from said communication control unit to itself.

52. A communication terminal of a communication system, wherein
a plurality of communication terminals share a single channel communicate bi-directionally at a predetermined communication cycle while avoiding a collision with each other, comprising:
communication request mean, for forming a communication request for calling a mating terminal of an object and transmitting this to said mating terminal by random access;
communication timing allocation means for, if a response from said mating terminal is returned corresponding to said communication request formed by said communication request means, allocating communication timing to itself which is a call terminal and said mating terminal and notifying other communication terminals of this;
responding means for, when responding to a communication request transmitted to itself, forming a response to be returned to said call terminal and transmitting this to said call terminal; and
transmission control means for transmitting data corresponding to said communication timing.

53. The communication terminal according to claim 51 further comprising a random access control means for,
if data to be transmitted is real time data, transmitting said real time data by said transmission control means based on said communication timing, and
if data to be transmitted is random data generated at random, controlling to transmit through a random access region other than the real time region for transmitting said real time data.

54. The communication terminal according to claim 53, wherein
said real time region for transmitting said real time data is set up successively each time when said communication timing is set up, and
said random access control means uses a remaining portion of said communication cycle in which said real time region is set up as said random access region.

55. The communication terminal according to claim 53 further comprising a re-transmission control means for, if said real time data transmitted through said real time region by control of said transmission control means is not received properly, re-transmitting said real time data not received properly through said random access region.

56. The communication terminal according to claim 51, wherein
said channel uses a carrier having same predetermined frequency and a carrier detecting means for detecting presence or absence of said carrier on said channel to avoid a collision of use of said channel is further provided.

57. The communication terminal according to claim 52 further comprising a random access control means for
if data to be transmitted is real time data, transmitting said real time data by said transmission control means based on said communication timing, and
if data to be transmitted is random data generated at random, transmitting through a random access region other than the real time region for transmitting said real time data in said communication cycle.

58. The communication terminal according to claim 57, wherein
said real time region for transmitting said real time data is set up successively each time when said communication order is set up in said communication cycle, and
said random access control means uses a remaining portion of said communication cycle in which said real time region is set up as said random access region.

59. The communication terminal according to claim 57 further comprising a re-transmission control means for, if said real time data transmitted through said real time region by control of said transmission control means is not received properly, re-transmitting said real time data not received properly through said random access region.

60. The communication terminal according to claim 52, wherein
said channel uses a carrier having same predetermined frequency and a carrier detecting means for detecting presence or absence of said carrier on said channel to avoid a collision of use of said channel is further provided.

61. A communication terminal of a communication system, wherein
at least a communication control unit and a plurality of communication terminals share a channel and each of said plurality of communication terminals carries out communication at every predetermined communication cycle while avoiding a collision with other communication terminals, comprising:
allocation request means for, prior to start-up of data communication, generating a communication order allocation request and transmitting this to said communication control unit;
empty time setting means of setting the length of an empty time of said channel capable of starting transmission of data corresponding to said communication order allocated by said communication control unit; and
data transmitting control means for, if emptiness of the same length as that of said empty time set up by said empty time setting means is detected on said channel at every communication cycle, transmitting data.

62. A communication terminal, wherein
a plurality of communication terminals share a single channel carry out communication at a predetermined communication cycle while avoiding a collision with other communication terminals, comprising:
communication order allocation means for, prior to start-up of data communication, allocating communication order to itself and notifying other communication terminals of this;
empty time setting means of setting the length of an empty time of said channel capable for starting transmission of data corresponding to said communication order allocated; and
data transmitting control means for, if emptiness of the same length as that of said empty time set up by said empty time setting means is detected on said channel at every communication cycle, transmitting data.

63. The communication terminal according to claim 61 further comprising a data transmission detecting means for detecting whether or not a communication terminal having a higher communication order than itself transmits data, wherein
if said data transmission detecting means detects that the communication terminal having a higher communication order than itself transmits data, said empty time setting means resets said empty time set in itself shorter corresponding to said communication order allocated.

64. The communication terminal according to claim 61 further comprising a random access control means for,
if data to be transmitted is real time data, transmitting said real time data by said transmission control means based on said communication timing, and
if data to be transmitted is random data generated at random, transmitting it through a random access region other than the real time region for transmitting said real time data.

65. The communication terminal according to claim 64, wherein
said real time region for transmitting said real time data is set up successively each time in said communication cycle when said communication timing is set up,
said random access control means using a remaining portion of said communication cycle in which said real time region is set up as said random access region.

66. The communication terminal according to claim 64 further comprising a re-transmission control means for, if said real time data transmitted through said real time region by control of said data transmission control means is not received properly, re-transmitting said real time data not received properly through said random access region.

67. The communication terminal according to claim 61, wherein said channel uses a carrier having a same predetermined frequency and detection of said empty time is carried out by detecting absence of said carrier on said channel.

68. The communication terminal according to claim 62 further comprising a data transmission detecting means for detecting whether or not a communication terminal having a higher communication order than itself transmits data, wherein
if said data transmission detecting means detects that the communication terminal having a higher communication order than itself transmits data, said empty time setting means resets said empty time set in itself shorter corresponding to said communication order allocated.

69. The communication terminal according to claim 62 further comprising a random access control means for,
if data to be transmitted is real time data, transmitting said real time data by said data transmission control means based on said communication timing, and
if data to be transmitted is random data generated at random, transmitting through a random access region other than the real time region for transmitting said real time data in said communication cycle.

70. The communication terminal according to claim 69, wherein
said real time region for transmitting said real time data is set up successively each time when said communication timing is set up in said communication cycle,
said random access control means using a remaining section of said communication cycle in which said real time region is set up as said random access region.

71. The communication terminal according to claim 69 further comprising a re-transmission control means for, if said real time data transmitted through said real time region by a control of said transmission control means is not received properly, re-transmitting said real time data not received properly through said random access region.

72. The communication terminal according to claim 62, wherein said channel uses a carrier having a same predetermined frequency and detection of said empty time is carried out by detecting absence of said carrier on said channel.

73. A communication terminal of a communication system, wherein
at least a communication control unit and a plurality of communication terminals share a channel and each of said plurality of communication terminals carries out bi-directional communication at every predetermined communication cycle while avoiding a collision with other communication terminals, comprising:

communication request means for forming a communication request for calling a mating terminal of an object and transmitting this to said mating terminal by random access;

allocation request means for, if a response from said mating terminal is returned corresponding to said communication request formed by said communication request means, forming a communication order allocation request to itself which is a call terminal and said mating terminal and transmitting this to said communication control unit;

responding means for, when responding to a communication request transmitted to itself, forming a response to be returned to said call terminal and transmitting this to said call terminal;

empty time setting means of setting the length of an empty time of said channel capable of starting transmission of data corresponding to said communication order allocated to itself by said communication control unit; and data transmitting control means for, if an emptiness of the same length as that of said empty time set up by said empty time setting means is detected on said channel, transmitting data.

74. A communication terminal of a communication system, wherein a plurality of communication terminals share a single channel communicate bi-directionally at a predetermined communication cycle while avoiding a collision with each other, comprising:

communication request means for forming a communication request for calling a mating terminal of an object and transmitting this to said mating terminal by random access;

communication timing allocation means for, if a response from said mating terminal is returned corresponding to said communication request formed by said communication request means, allocating communication order to itself which is a call terminal and said mating terminal and notifying other communication terminals of this;

responding means for, when responding to a communication request for itself, forming a response to be returned to said call terminal and transmitting this to said call terminal;

empty time setting means of setting the length of an empty time of said channel capable of starting transmission of data corresponding to said communication order allocated; and data transmission control means for, if emptiness of the same length as that of said empty time set up by said empty time setting means is detected on said channel, transmitting data.

75. The communication terminal according to claim 73 further comprising a data transmission detecting means for detecting whether or not a communication terminal having a higher communication order than itself transmits data, wherein if said data transmission detecting means detects that the communication terminal having a higher communication order than itself transmits data, said empty time setting means resets said empty time set in itself shorter corresponding to said communication order allocated.

76. The communication terminal according to claim 73 further comprising a random access control means for if data to be transmitted is real time data, transmitting said real time data by said transmission control means based on said communication timing, and if data to be transmitted is random data generated at random, transmitting through a random access region other than the real time region for transmitting said real time data.

77. The communication terminal according to claim 76, wherein said real time region for transmitting said real time data is set up successively each time when said communication order is set up, said random access control means using a remaining portion of said communication cycle in which said real time region is set up as said random access region.

78. The communication terminal according to claim 76 further comprising a re-transmission control means for, if said real time data transmitted through said real time region by control of said data transmission control means is not received properly, re-transmitting said real time data not received properly through said random access region.

79. The communication terminal according to claim 73, wherein said channel uses a carrier having a same predetermined frequency and detection of said empty time is carried out by detecting absence of said carrier on said channel.

80. The communication terminal according to claim 74 further comprising a data transmission detecting means for detecting whether or not a communication terminal having a higher communication order than itself transmits data, wherein if said data transmission detecting means detects that the communication terminal having a higher communication order than itself transmits data, said empty time setting means resets said empty time shorter corresponding to said communication order allocated.

81. The communication terminal according to claim 74 further comprising a random access control means for, if data to be transmitted is real time data, transmitting said real time data by said transmission control means based on said communication timing, and if data to be transmitted is random data generated at random, transmitting through a random access region other than the real time region for transmitting said real time data in said communication cycle.

82. The communication terminal according to claim 81, wherein said real time region for transmitting said real time data is set up successively each time when said communication order is set up in said communication cycle, said random access control means using a remaining portion of said communication cycle in which said real time region is set up as said random access region.

83. The communication terminal according to claim 81 further comprising a re-transmission control means for, if said real time data transmitted through said real time region by control of said data transmission control means is not received properly, re-transmitting said real time data not received properly through said random access region.

84. The communication terminal according to claim 74, wherein said channel uses a carrier having a same predetermined frequency and detection of said empty time is carried out by detecting absence of said carrier on said channel.

* * * * *

UNITED STATES PATENT AND TRADEMARK OFFICE
CERTIFICATE OF CORRECTION

PATENT NO. : 7,352,735 B1
APPLICATION NO. : 09/762424
DATED : April 1, 2008
INVENTOR(S) : Morihiko Hayashi It is certified that error appears in the above-identified patent and that said Letters Patent is hereby corrected as shown below:

On Title page, immediately preceding INID (51), please insert:

--(30) Foreign Application Priority Data

Jun. 8, 1999 (JP) 11/160,793;

Mar. 13, 2000 (JP) 2000-69161;

May 15, 2000 (JP) 2000-42127--;

Column 1, line 29, "is other" should read --is another--;

Column 2, line 5, "other" should read --another--;

Column 2, line 27, "method" should read --methods--;

Column 5, line 15, "timing" should read --timings--;

Column 5, line 40, delete "upon";

Column 5, line 44, "terminal" should read --terminals--;

Column 7, line 45, "terminal" should read --terminals--;

Column 9, line 28, "timing" should read --timings--;

Column 10, line 51, "of" should read --of a--;

Column 10, line 65, "explaining LAN" should read --explaining a LAN--;

Column 11, line 2, "to communication" should read --to a communication--;

Column 12, line 56, "have a" should read --has a--;

UNITED STATES PATENT AND TRADEMARK OFFICE
CERTIFICATE OF CORRECTION

PATENT NO. : 7,352,735 B1
APPLICATION NO. : 09/762424
DATED : April 1, 2008
INVENTOR(S) : Morihiko Hayashi It is certified that error appears in the above-identified patent and that said Letters Patent is hereby corrected as shown below:

Column 14, line 16, "timing" should read --timings--;

Column 14, line 58, "timing" should read --timings--;

Column 17, line 11, "and capable" should read --and be capable--;

Column 19, line 17, "of case" should read --of a case--;

Column 21, line 9, "in case" should read --in the case--;

Column 21, line 54, delete "by";

Column 21, line 55, "methods. are" should read --methods are--;

Column 22, line 49, "data is" should read --data are--;

Column 23, line 18, "have" should read --has--;

Column 23, line 43, "supplies it" should read --supplies them--;

Column 25, line 16, "there is" should read --there are--;

Column 26, line 10, "come to" should read --comes to--;

Column 32, line 66, "out 50" should read --out in 50--;

Column 33, line 13, "if other" should read --if another--;

Column 33, line 14, "exist" should read --exists--;

Column 38, line 45, "arise" should read --arises--;

Column 45, line 66, "share" should read --sharing--;

UNITED STATES PATENT AND TRADEMARK OFFICE
CERTIFICATE OF CORRECTION

PATENT NO. : 7,352,735 B1
APPLICATION NO. : 09/762424
DATED : April 1, 2008
INVENTOR(S) : Morihiko Hayashi It is certified that error appears in the above-identified patent and that said Letters Patent is hereby corrected as shown below:

Column 46, line 3, "mean," should read --means--;

Column 46, line 46, "having same" should read --having a--;

Column 47, line 9, "having same" should read --having a--;

Column 49, line 28, "share" should read --sharing--.

Signed and Sealed this

Twelfth Day of May, 2009

JOHN DOLL
*Acting Director of the United States Patent and Trademark Office*